United States Patent
Vallo et al.

(10) Patent No.: US 12,203,591 B2
(45) Date of Patent: Jan. 21, 2025

(54) CANTILEVERED AND EXTENDABLE SUPPORT SYSTEMS FOR SUPPORTING STORAGE CONTAINERS

(71) Applicant: THEWLEY, LLC, Xenia, OH (US)

(72) Inventors: Matthew John Vallo, Dayton, OH (US); Gabrielle Marie Jackson, Dayton, OH (US)

(73) Assignee: Thewley, LLC, Xenia, OH (US)

( * ) Notice: Subject to any disclaimer, the term of this patent is extended or adjusted under 35 U.S.C. 154(b) by 269 days.

(21) Appl. No.: 17/850,937

(22) Filed: Jun. 27, 2022

(65) Prior Publication Data

US 2022/0349519 A1    Nov. 3, 2022

Related U.S. Application Data

(63) Continuation-in-part of application No. 16/523,959, filed on Jul. 26, 2019, now Pat. No. 11,369,197.

(60) Provisional application No. 62/703,591, filed on Jul. 26, 2018.

(51) Int. Cl.
  F16M 13/02    (2006.01)
  B65D 25/00    (2006.01)

(52) U.S. Cl.
  CPC ............ F16M 13/02 (2013.01); B65D 25/00 (2013.01)

(58) Field of Classification Search
  CPC .. F16M 13/02; F16M 11/2092; F16M 13/022; F16M 11/041; B65D 25/00
  See application file for complete search history.

(56) References Cited

U.S. PATENT DOCUMENTS

| | | | | |
|---|---|---|---|---|
| 3,249,233 A * | 5/1966 | Marcus | ............... | A47H 1/022 211/172 |
| 4,673,089 A * | 6/1987 | Chap | ............... | A47G 23/0208 211/119 |
| 5,673,801 A * | 10/1997 | Markson | ............... | A47F 1/126 211/59.3 |
| 6,364,136 B1 * | 4/2002 | Weshler | ............... | A47F 5/103 211/175 |
| 7,219,806 B1 * | 5/2007 | Morrow | ............... | A47F 5/0869 211/59.1 |
| 7,735,797 B2 * | 6/2010 | Hu | ............... | F16M 11/10 248/221.11 |
| 8,245,989 B2 * | 8/2012 | Ling | ............... | H05K 7/1411 248/221.11 |
| 8,763,967 B2 * | 7/2014 | Fu | ............... | G06F 1/187 248/221.11 |
| 10,016,070 B1 * | 7/2018 | DeSena | ............... | A47F 5/0869 |
| 11,632,865 B1 * | 4/2023 | Liang | ............... | F16M 11/041 248/221.11 |
| 2005/0225219 A1 * | 10/2005 | Chen | ............... | A47B 88/43 312/334.5 |

(Continued)

FOREIGN PATENT DOCUMENTS

WO    WO-2017015466 A1 *    1/2017    ............ A47F 1/125

Primary Examiner — Hanh V Tran

(57) ABSTRACT

A support system for a storage container includes an extendable slide assembly having a first or supported end and a second or free end, and a support bracket removably receiving the first end of the extendable slide assembly to support the extendable slide assembly in a cantilevered manner. The second or free end of the extendable slide assembly is configured to support the storage container.

20 Claims, 25 Drawing Sheets

(56) References Cited

U.S. PATENT DOCUMENTS

| | | | |
|---|---|---|---|
| 2009/0032482 A1* | 2/2009 | Battaglia | A47F 5/0823 211/59.1 |
| 2013/0094127 A1* | 4/2013 | Lu | F16M 11/06 361/679.01 |
| 2013/0233980 A1* | 9/2013 | Chen | H05K 7/1491 248/221.11 |
| 2014/0190917 A1* | 7/2014 | Szpak | A47B 96/024 211/134 |
| 2014/0346129 A1* | 11/2014 | Hall | A47B 45/00 29/434 |
| 2015/0082597 A1* | 3/2015 | Hightower | A47B 88/43 29/408 |
| 2015/0296982 A1* | 10/2015 | Chen | A47B 77/18 312/334.8 |
| 2016/0081215 A1* | 3/2016 | Boretti | H05K 7/1474 248/221.11 |
| 2016/0105978 A1* | 4/2016 | Xu | G06F 1/1632 248/220.22 |
| 2017/0079425 A1* | 3/2017 | Mansley | E05B 65/46 |
| 2017/0202369 A1* | 7/2017 | Mercier | A47F 5/083 |
| 2017/0208935 A1* | 7/2017 | Vallo | A47B 95/02 |
| 2018/0020848 A1* | 1/2018 | Mercier | A47F 1/126 108/61 |
| 2018/0128538 A1* | 5/2018 | Jang | A47B 57/30 |

\* cited by examiner

CANTILEVERED AND EXTENDABLE SUPPORT SYSTEMS FOR SUPPORTING STORAGE CONTAINERS

CROSS-REFERENCE TO RELATED APPLICATIONS

This application is a continuation-in-part application of U.S. patent application Ser. No. 16/523,959 filed on Jul. 29, 2019, now U.S. Pat. No. 11,369,197 issued on Jun. 28, 2022, which claims the priority benefit of U.S. Provisional Patent Application No. 62/703,591 filed on Jul. 26, 2018, the disclosures of which are expressly incorporated herein in their entireties by reference.

STATEMENT REGARDING FEDERALLY SPONSORED RESEARCH

Not Applicable

PARTIES TO A JOINT RESEARCH AGREEMENT

Not Applicable

REFERENCE TO APPENDIX

Not Applicable

FIELD OF THE INVENTION

The field of the present invention generally relates to storage containers and, more particularly, to systems and methods for supporting storage containers.

BACKGROUND OF THE INVENTION

Many types of storage containers or compartments are used to store and/or transport a wide variety of goods. Such storage containers or compartments include, but are not limited to, bags, baskets, bins, boxes, buckets, cabinets, caddies, canisters, cans, chests, coolers, crates, cubes, drawers, luggage, suitcases, trunks, totes, tubs, and the like. Storage containers typically hold the goods in a satisfactory manner. However, the storage containers must typically be placed on the floor, furniture, shelves, and/or the like. This can occupy large amounts of space and can even result in the storage containers being stacked on top of one another and/or in front of one another. This stacking of storage containers can severely reduce access to the contents of the storage containers. It can also be difficult to access contents when the storage containers are placed on shelves or furniture because the storage containers can be at inconvenient heights and/or can be difficult to move.

One such situation is traveling individuals using luggage for transporting their personal belongings. Upon arrival at a destination, clothing and/or other personal items stored in the luggage must be removed from the luggage and placed in drawers of furniture such as a dresser or the like. This transfer can require considerable effort, particularly when situation where the stay is as short as a single night. Alternatively, the clothing and/or personal items can remain stored in the luggage with the luggage placed on top of furniture or on the top of a luggage stand. However, such an approach occupies the furniture top or floor space so that it cannot be used in other ways. Additionally, there often is not enough furniture or luggage stands to accommodate all of the luggage.

Accordingly, there is a need for improved systems, devices, and methods for supporting storage containers and compartments.

SUMMARY OF THE INVENTION

Disclosed are systems, devices, and methods for supporting storage containers that overcome at least one of the disadvantages of the prior art described above. Disclosed is a support bracket for supporting an extendable slide assembly in a cantilevered manner from a support, the extendable slide assembly having a first end for removable attachment to the support bracket and a second end for supporting a storage compartment, The support bracket comprising, in combination, a mounting portion configured to be secured to the support; an attachment portion supported by the mounting portion and configured to removably receive the first end of the extendable slide assembly, and a lock mechanism. The attachment portion includes a plurality of abutments comprising: at least one downward facing abutment configured to limit upward movement of the first end of the extendable slide assembly; at least one upward facing abutment configured to limit downward movement of the first end of the extendable slide assembly; at least one right facing abutment configured to limit leftward movement of the first end of the extendable slide assembly; at least one left facing abutment configured to limit rightward movement of the first end of the extendable slide assembly; at least one forward facing abutment configured to limit rearward movement of the first end of the extendable slide assembly; and at least one rearward facing abutment configured to limit forward movement of the first end of the extendable slide assembly. The lock mechanism is configured to selectively move at least one of the abutments between a locking position limiting movement of the first end of the extendable slide assembly in at least one direction and an unlocking position to allow movement of the first end of the extendable slide assembly in the at least one direction.

Also disclosed is a support system for a storage container comprising, in combination, an extendable slide assembly having a first end and a second end, and a support bracket having an attachment portion removably receiving the first end of the extendable slide assembly to support the extendable slide assembly in a cantilevered manner. The second end of the extendable slide assembly is configured to support the storage container. The attachment portion includes a plurality of abutments comprising: at least one downward facing abutment configured to limit upward movement of the first end of the extendable slide assembly; at least one upward facing abutment configured to limit downward movement of the first end of the extendable slide assembly; at least one right facing abutment configured to limit leftward movement of the first end of the extendable slide assembly; at least one left facing abutment configured to limit rightward movement of the first end of the extendable slide assembly; at least one forward facing abutment configured to limit rearward movement of the first end of the extendable slide assembly, and at least one rearward facing abutment configured to limit forward movement of the first end of the extendable slide assembly. The support bracket also has a lock mechanism configured to selectively move at least one of the abutments between a locking position limiting movement of the first end of the extendable slide assembly in at least one direction and an unlocking position to allow movement of the first end of the extendable slide assembly in the at least one direction.

Additionally disclosed is a storage container support system-comprising, in combination, a storage container; an extendable slide assembly having a first end and a second end, wherein the second end moves away from the first end and toward the first end respectively when the extendable slide assembly is extended and retracted, and a support bracket including a mounting portion and an attachment portion supported by the mounting portion and a lock mechanism, wherein the attachment portion is configured to selectively and removably receive the first end of the extendable slide assembly. The second end of the extendable slide assembly is configured to support the storage container. The attachment portion includes a plurality of abutments comprising: at least one downward facing abutment configured to limit upward movement of the first end of the extendable slide assembly; at least one upward facing abutment configured to limit downward movement of the first end of the extendable slide assembly; at least one right facing abutment configured to limit leftward movement of the first end of the extendable slide assembly; at least one left facing abutment configured to limit rightward movement of the first end of the extendable slide assembly; at least one forward facing abutment configured to limit rearward movement of the first end of the extendable slide assembly; and at least one rearward facing abutment configured to limit forward movement of the first end of the extendable slide assembly. The lock mechanism is configured to selectively move at least one of the abutments between a locking position limiting movement of the first end of the extendable slide assembly in at least one direction and an unlocking position to allow movement of the first end of the extendable slide assembly in the at least one direction.

From the foregoing disclosures and the following more detailed description of various preferred embodiments it will be apparent to those skilled in the art that the present invention provides a significant advance in the technology and art of storage container support systems, devices, and methods. Particularly significant in this regard is the potential the invention affords for storage container support systems, devices, and methods that that enable persons to removably support storage containers in a cantilevered and/or extendable manner with minimal effort and inconvenience. Additional features and advantages of various preferred embodiments will be better understood in view of the detailed description provided below.

BRIEF DESCRIPTION OF THE DRAWINGS

These and further features of the present invention will be apparent with reference to the following description and drawing, wherein.

Figure 1:
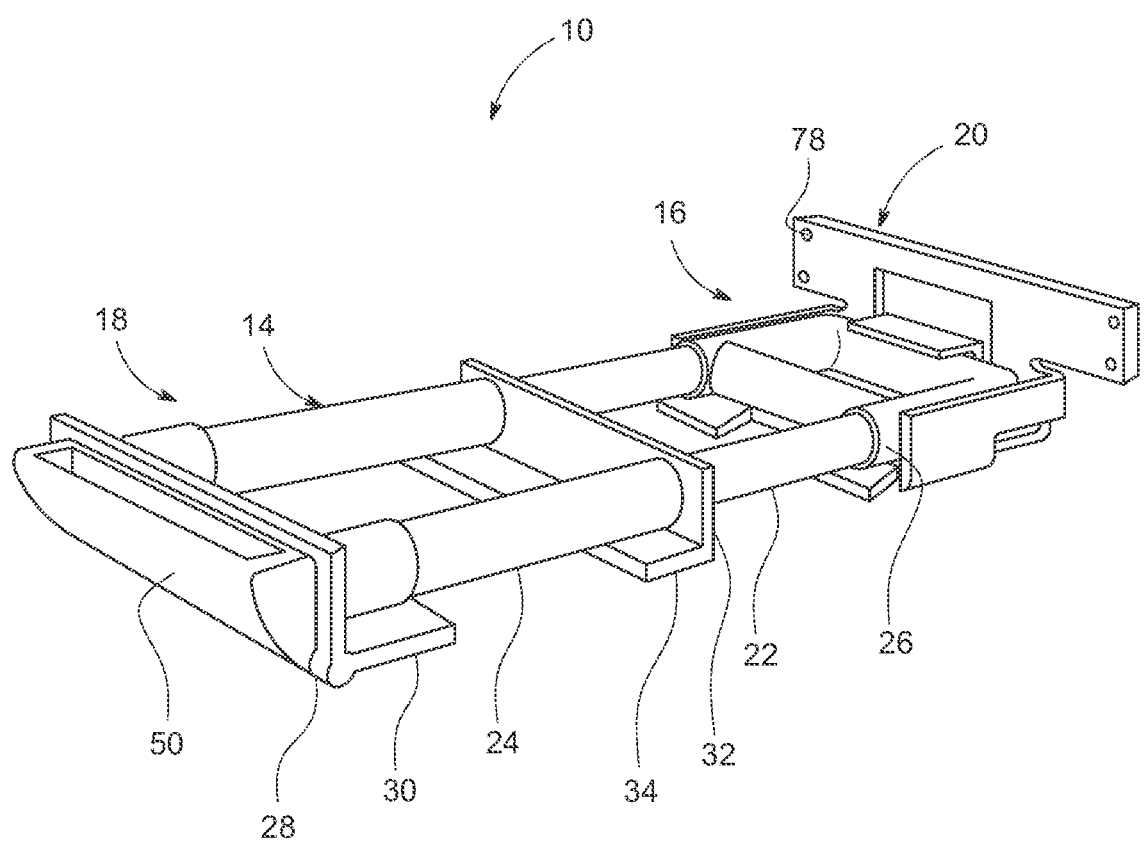
FIG. 1 is a perspective view of a support system for a storage container according to a first embodiment of the present invention, wherein an extendable slide assembly is in an extended position and removably secured to a support bracket in a cantilevered manner.

It should be understood that the appended drawings are not necessarily to scale, presenting a somewhat simplified representation of various preferred features illustrative of the basic principles of the invention. The specific design features of the support systems and devices as disclosed herein, including, for example, specific dimensions and shapes of the various components will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the storage compartment support systems illustrated in the drawings. In general, up or upward refers to an upward direction generally within the plane of the paper in FIG. 1 and down or downward refers to a downward direction generally within the plane of the paper in FIG. 1. Also in general, forward or front refers to a direction extending to the left generally within the plane of the paper in FIG. 1 and back or rear refers to a direction extending to the right generally within the plane of the paper in FIG. 1.

DETAILED DESCRIPTION OF CERTAIN PREFERRED EMBODIMENTS

It will be apparent to those skilled in the art, that is, to those who have knowledge or experience in this area of technology, that many uses and design variations are possible for the support systems and methods for storage containers disclosed herein. The following detailed discussion of various alternative and preferred embodiments will illustrate the general principles of the invention. Other embodiments suitable for other applications will be apparent to those skilled in the art given the benefit of this disclosure.

Figure 2:
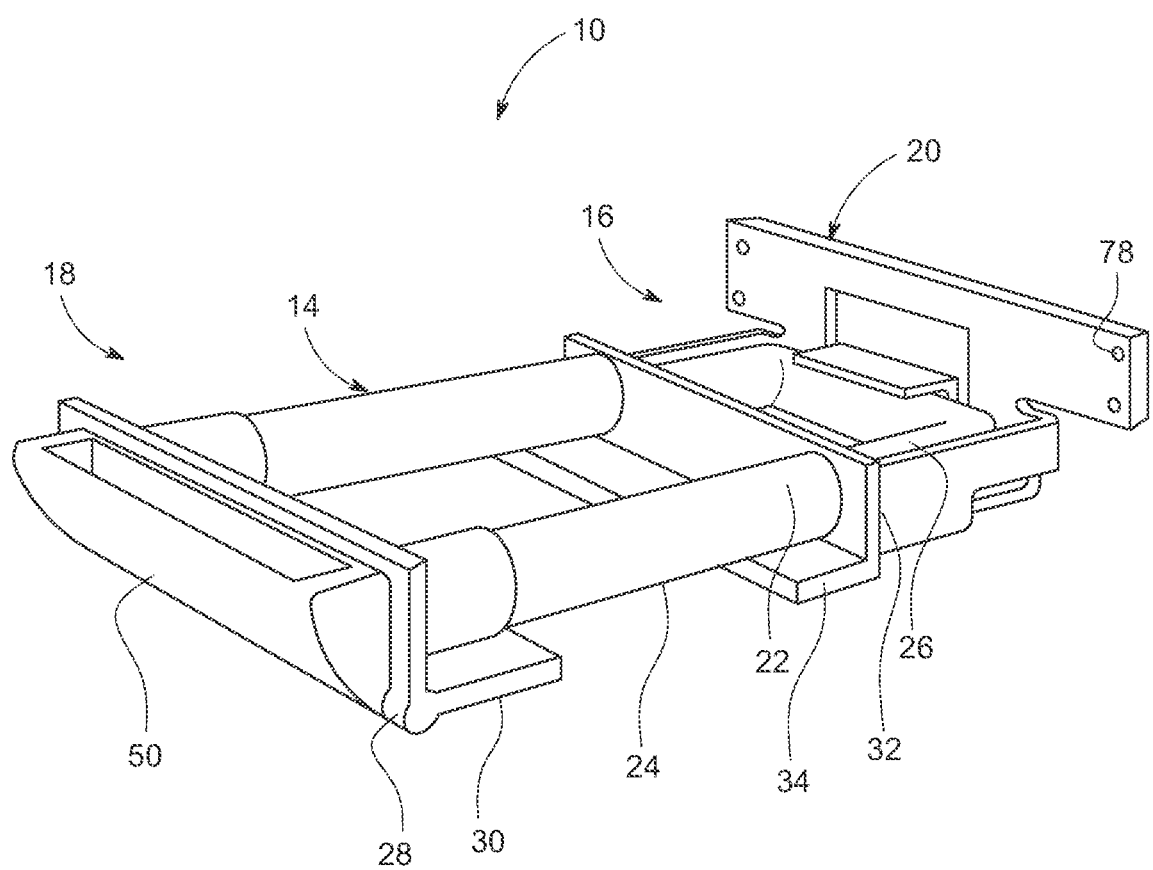
FIG. 2 is a perspective view of the support system of FIG. 1, wherein the extendable slide assembly is in retracted position.
Figure 3:
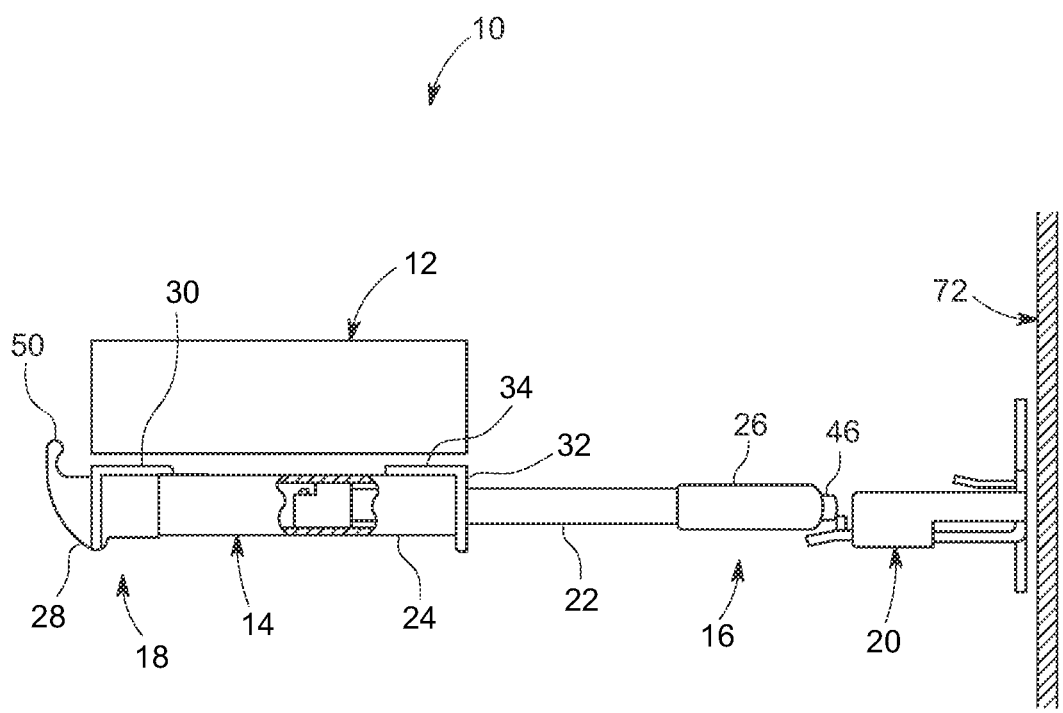
FIG. 3 is an exploded side elevational view of a variation of the support system of FIG. 1, wherein flanges for engaging the storage container face in an opposite direction.

FIGS. 1 to 3 illustrate a support system 10 for a storage container 12 according to the present invention. The illustrated support system 10 includes an extendable slide assembly 14 having a first end 16 and a second end 18, and a support bracket 20 removably receiving the extendable slide assembly 14 to support the extendable slide assembly 14 in a cantilevered manner. The first end 16 of the illustrated extendable slide assembly 14 is removably received by the support bracket 20 and the second end 18 of the illustrated extendable slide assembly 14 is configured to support the storage container 12.

Figure 4:
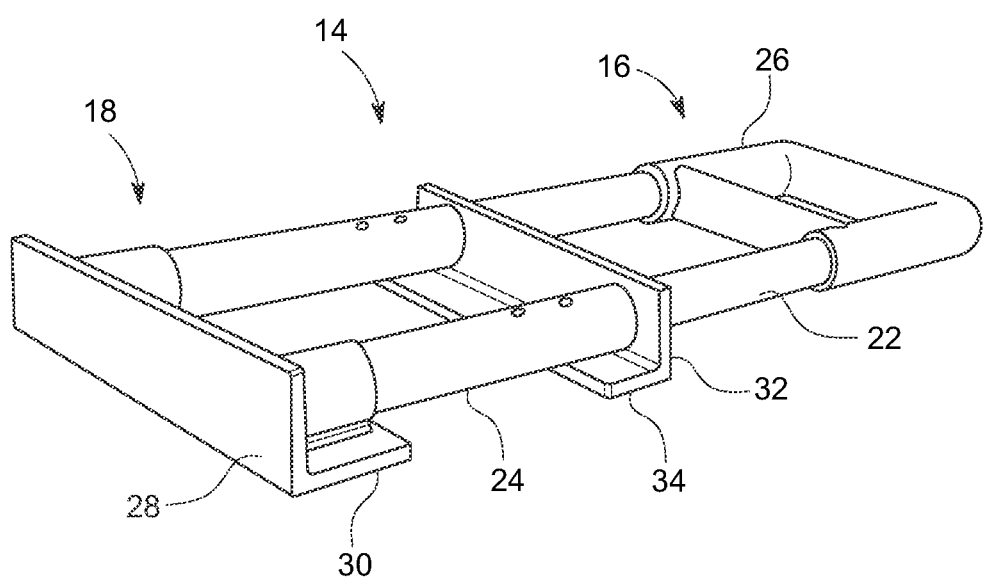
FIG. 4 is perspective view of a variation the extendable slide assembly of FIGS. 1 and 2 in a retracted position, wherein a second lock or drawer handle latch is eliminated.
Figure 5:
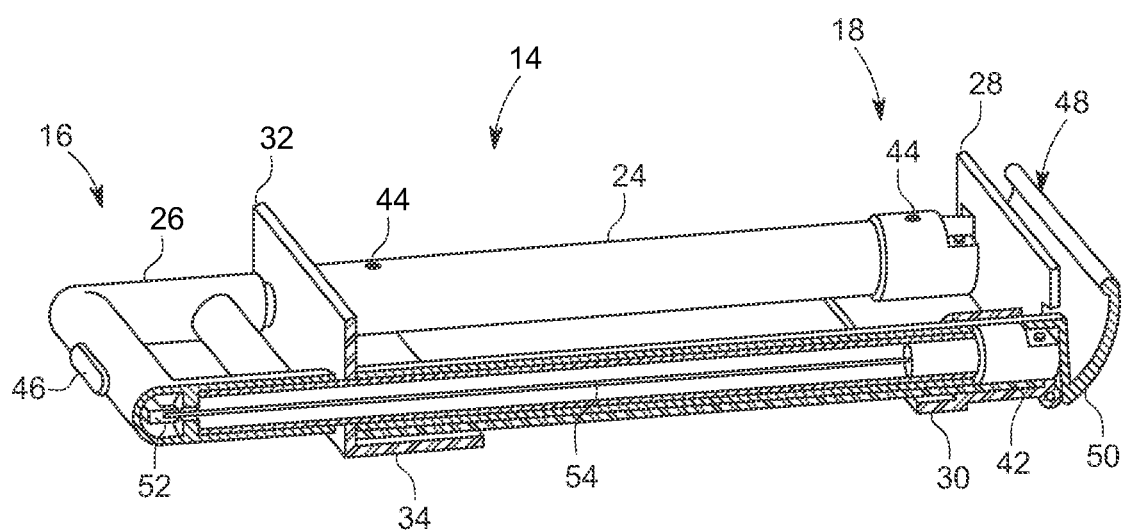
FIG. 5 is perspective view of the extendable slide assembly which is similar to FIG. 4 but is viewed from the opposite direction and is cross-sectioned.

FIGS. 4 and 5 illustrate an exemplary extendable slide assembly 14 which includes two pairs of laterally spaced-apart and parallel telescoping first and second extendable members 22, 24 extending between the first end 16 and the second end 18. Alternatively, the extendable slide assembly 14 can include only one pair or more than two pairs telescoping first and second extendable members 22, 24. The first and second extendable members 22, 24 are connected together in a telescoping member so that they are extended and retracted between a fully retracted position and fully extended position. The illustrated first and second extendable members 22, 24 are each rigid, elongate hollow tubes having circular cross-sections with the first extendable members 22 having a smaller outer diameter than the second extendable members 24 so that the first extendable members 22 are received within in the second extendable members 24 in a telescoping manner. The first and second extendable members 22, 24 can be formed of any suitable material. The first and second extendable members 22, 24 can alternatively have any other suitable shape, cross-sectional shape, and/or configuration.

A first end connector 26 connects the first or rearward end of each of the first extendable members together 22. The illustrated first end connecter 26 has a pair of forward facing and laterally spaced-apart sockets for receiving the rearward ends of the first extendable members 22. The first end connector 26 is configured as a hollow handle but any other suitable shape can alternatively be utilized. The illustrated first end connector or handle 26 has a pair of laterally spaced-apart side portions forming the sockets, a laterally extending first cross portion connecting the first or rearward ends of the side portions, and a laterally extending second cross portion connecting the side portions at or near the second or forward ends of the side portions. The first cross portion is preferably sized and shaped to be grasped by hand to be used as a handle when the extendable slide assembly 14 is not secured to the support bracket 20. The first end connector 26 can be formed of any suitable material. The first end connector 26 can alternatively have any other suitable configuration.

A second end connector 28 connects the second or forward end of each of the second extendable members together 24. The illustrated second end connecter 28 has a pair of rearward facing and laterally spaced-apart sockets for receiving the forward ends of the second extendable members therein 14. The second end connector 28 also has a laterally extending cross portion or bracket connecting the second or forward ends of the sockets. The top and/or bottom of the illustrated cross portion is provided with a flange 30 for supporting the storage container 12 depending on the specific application as described in more detail hereinbelow. The illustrated flange 30 is perpendicular to the cross portion and provides an outer surface that is generally planer for supporting the storage container 12. If desired, the flange 30 can be provided fastener openings or any other suitable fastening means for fixing or removably securing the storage container 12 to the flange 30. The second end connector 28 can be formed of any suitable material. The second end connector 28 can alternatively have any other suitable configuration.

An intermediate connector 32 connects the first or rearward end of each of the second extendable members together 24. The illustrated intermediate connecter 32 has a laterally extending cross portion or bracket connecting the first or rearward ends of the second extendable members 24. The top and/or bottom of the illustrated cross portion is provided with a flange 34 for supporting the storage container 12 depending on the specific application as described in more detail hereinbelow. The illustrated flange 34 is perpendicular to the cross portion and provides an outer surface that is generally planer for supporting the storage container 12. If desired, the flange 34 can be provided with fastener openings or any other suitable fastening means for fixing or removably securing the storage container 12 to the flange 34. The intermediate connector 32 can be formed of any suitable material. The intermediate connector 32 can alternatively have any other suitable configuration.

The illustrated flanges 30, 34 of the second end connector 28 and the intermediate connector 32 cooperate to form a generally planer support surface for the storage container 12. With the flanges 30, 34 located at the top (best shown in FIG. 3), the storage container 12 can be supported directly on top of the flanges 30, 34. With the flanges 30, 34 located at the bottom (best shown in FIGS. 1 and 2), the flanges 30, 34 can be fixed or removably secured to an upward facing surface within the storage container 12 to support the storage container 12 through the flanges 30, 34. The flanges 30, 34 can alternatively have any other suitable, size, shape or configuration.

Figure 6:
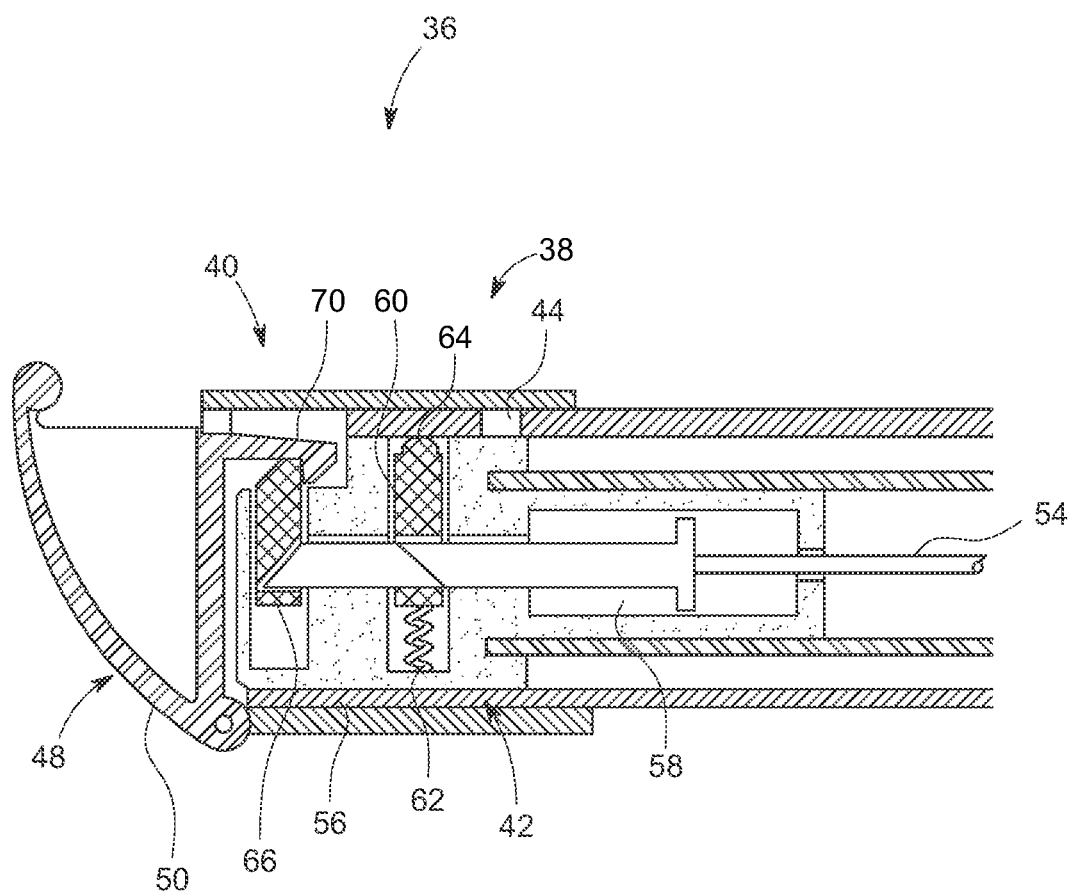
FIG. 6 is fragmented and enlarged cross-sectional view of a dual handle latch and slide stop assembly of the extendable slide assembly of FIG. 5.
Figure 7:
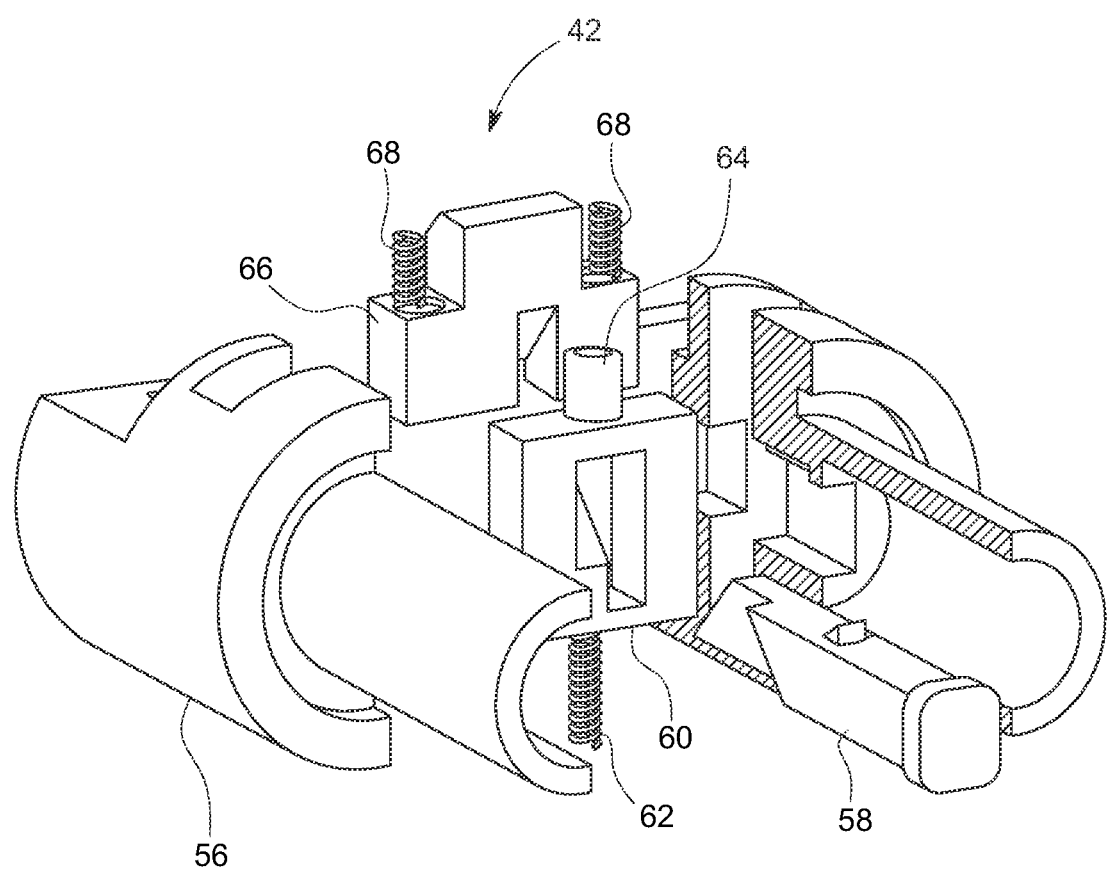
FIG. 7 is an exploded perspective view of the slide stop assembly of the dual handle latch and slide stop assembly of FIG. 6.

As best shown in FIGS. 5 to 7, the illustrated extendable slide assembly 14 also includes a dual lock system 36 having a first lock 38 and a second lock 40. The illustrated first lock 38 is in the form of slide stop assembly 42. The illustrated first lock 38 prevents relative movement between the first and second extendable members 22, 24 when the first lock 38 is locked at predetermined positions and permits relative movement between the first and second extendable members 22, 24 when the first lock 38 is unlocked or released. The illustrated predetermined positions are at a substantially fully retracted position and at a substantially fully extended position and are defined by apertures 44 through the top of the second extendable members 24. It is noted that alternatively, different or additional positions can be utilized or alternatively the first lock can be configured to provide locking at infinite positions. The first lock 38 includes a first actuator 46 which can be manually activated or actuated to release the first lock 38. The illustrated first actuator 46 is a release button that unlocks the first lock 38 when depressed. The illustrated first actuator 46 is located at the rearward end of the first end connector or handle 26. Configured in this manner, the first lock 38 can be used to adjust the extendable slide assembly 14 between extended and retracted positions and lock the extendable slide assembly 14 in a desired one of the predetermined positions as desired when the extendable slide assembly 14 is not secured to the support bracket 20. However, when the extendable slide assembly 14 is secured to the support bracket 20, the first actuator 46 is automatically actuated to unlock the first lock 38 so that the extendable slide assembly 14 freely extends and retracts except when the second lock 40 is locked as described hereinbelow.

The illustrated second lock 40 is drawer handle latch assembly 48. The illustrated second lock 40 prevents relative movement between the first and second extendable members 22, 24 when the second lock 40 is locked and the first and second extendable members 22, 24 are in a fully retracted position and permits relative movement between the first and second extendable members 22, 24 when the second lock 40 is unlocked or released and the extendable members 22, 24 are not in their fully retracted position. It is noted that alternatively different or additional locking positions can be utilized or alternatively the second lock can be configured to provide locking at infinite positions. The second lock 40 includes a second actuator 50 which can be manually activated or actuated to release the second lock 40. The illustrated second actuator 50 is a pivoting drawer handle that unlocks the second lock 40 when pulled as described in more detail hereinbelow. The illustrated second actuator 50 is located at the forward end of the second end connector 28. Configured in this manner, the second lock 40 can be used to lock the extendable slide assembly 14 in a fully retracted position when the extendable slide assembly 14 is secured to the support bracket 20 and the extendable slide assembly 14 is unlocked and fully adjustable when not in the fully retracted position. However, when the extendable slide assembly 14 is not secured to the support bracket 20, the first lock 38 is utilized to lock the position of the extendable slide assembly 14 as described hereinabove. The second lock 40 can alternatively have any other suitable configuration. It is noted that the second lock 40 can be eliminated if desired (best shown in FIG. 4).

As best shown in FIGS. 5 to 7, the illustrated first lock 38 includes the release button 46 which is spring biased in a rearward direction to its unactuated or undepressed position. Rigid arms 52 extend laterally outward from the release button 46 to the forward-facing sockets of the first connecting member 26. The rigid arms 52 move with the release button 46 as it is depressed and returned. A rigid rod 54 extends from each outer end of the arms 52, through the first extendable members 22 to the slide stop assembly 42 located at the rearward ends of the first extendable members 22. The rigid rods 54 move with the rigid arms 52 and the release button 46 as the release button 46 is depressed and returned. Only one of the slide stop assemblies 42 will be described because they are each the same in the illustrated embodiment. The illustrated slide stop assembly 42 includes a stop housing 56 secured to the forward end of the first extendable member 22 for movement therewith within the second extendable member 24. The stop housing 56 is sized for close sliding receipt within the second extendable member 24. A brake cam member 58 is positioned within the stop housing 56 for axial movement therein in the forward/rearward direction. The forward end of the rigid rod 54 is secured to the rearward end of the cam member 58 such that the cam member 58 axially moves with the rigid rod 54 upon depression and return of the release button 46. The cam member 58 has a first cam surface and a second cam surface located forward of the first cam surface. The first cam surface is angled and downward facing to cooperate with a cam surface of a brake block 60. The brake block 60 is biased in an upward direction by a helical coil compression spring 62 located below the brake block 60. The cam surface of the brake block 60 is angled and upward facing so that movement of the cam member 58 in the forward direction moves the brake block 60 down against the bias of the spring 62. The upper side of the brake block 60 is provided with a vertically extending lock pin 64. When the release button 46 is undepressed, the lock pin 64 is biased upwardly so that when it aligns with one of the apertures 44 in the second extendable member 24 and the lock pin is 64 pushed up through the aperture to prevent sliding movement of the second extendable member 24 relative to the first extendable member 22. When the release button 4 is depressed, the cam member 58 is moved in the forward direction to downwardly cam the brake block 60 remove the lock pin 64 from the aperture 44 to permit sliding movement of the second extendable member 24 relative to the first extendable member 22.

As best shown in FIGS. 6 and 7, the illustrated second lock 40 includes a latch block 66 located at a forward end of the stop housing 56. The latch block 66 is biased in a downward direction by a pair of helical coil compression springs 68 located above the latch block 66. The latch block 66 has a cam surface that is angled and downward facing to cooperate with the second cam surface of the cam member 58 so that movement of the cam member 58 in the forward direction moves the latch block 66 up against the bias of the springs 68. The upper side of the latch block 66 is provided with rearward facing latch abutment which cooperates with a latch hook 70 of the pivoting drawer handle 50 and having a forward facing abutment. When the release button 46 is undepressed, the latch abutment of the latch block 66 is biased downwardly so that it cannot interact with the latch hook 70. When the release button 46 is depressed, the cam member 58 is moved in the forward direction to upwardly cam the latch block 66 in an upwardly direction so that it can interlock with the latch hook 70 when the first and second extendable members 22, 24 are fully retracted to prevent sliding movement of the second extendable member 24 relative to the first extendable member 22. When it is desired to extend the extendable members 22, 24 from this position, the pivoting drawer handle 50 is pulled so that it pivots forwardly to disengage the latch hook 70 from the latch block 66. Further pulling of the drawer handle 50 moves the second extendable members 24 relative to the first extendable members 22 to extend the extendable slide assembly 14. The latch hook 70 and the latch block 66 are provided with cooperating cam surfaces so that the latch block 66 is downwardly moved against the bias of the springs 68 upon contact during rearward movement of the second extendable members 24 relative to the first extendable members 22 to the fully retracted position so that the latch hook 70 can lock with the abutment of the latch block 66 once it passes by the latch block 66 and the latch block 66 is biased back into position by the springs 68.

Figure 8:
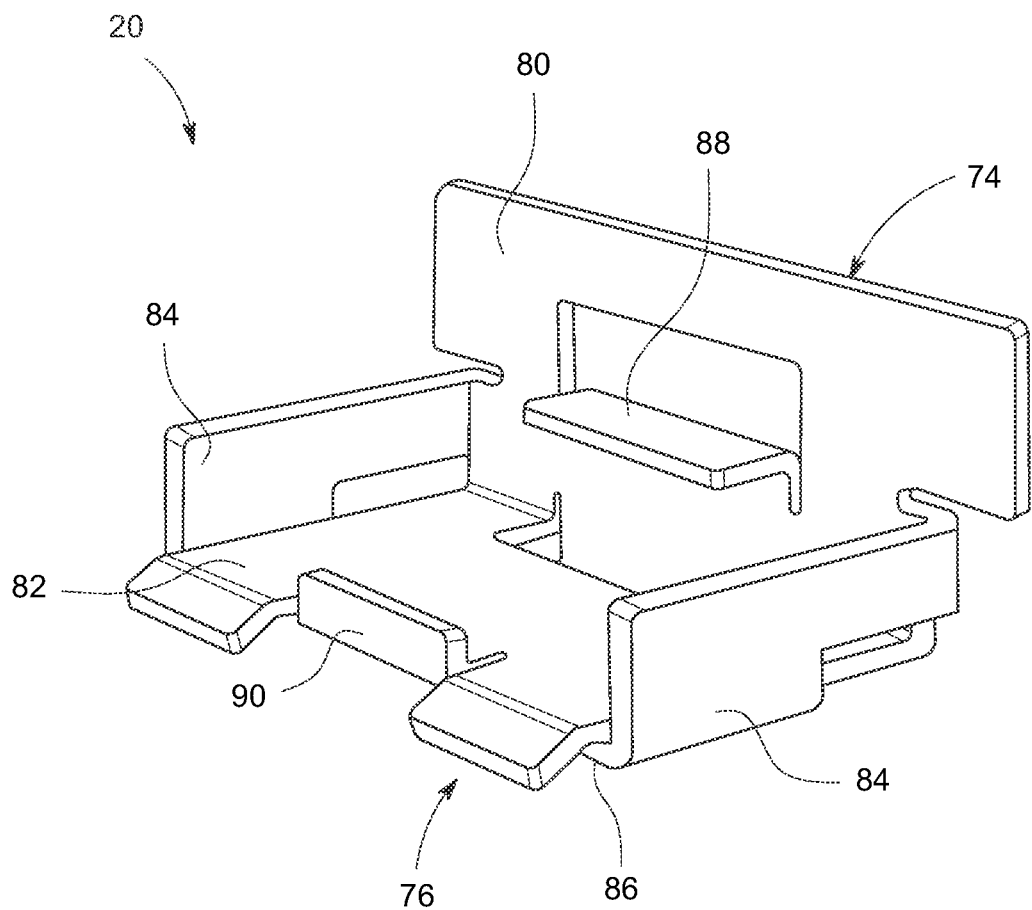
FIG. 8 is a perspective view of the support bracket of FIGS. 1 and 2.

FIG. 8 illustrates an exemplary support bracket 20 for supporting the extendable slide assembly 14 from a support 72 in a cantilevered manner. The support 72 can be any suitable support such as, for example but not limited to, a vertically extending wall or surface, a frame, a vehicle, and the like. The support bracket 20 receives the first end 16 of the extendable slide assembly 14 such that the second end 18 of the extendable slide assembly 14 is the free end. The illustrated support bracket 20 includes a mounting portion 74 configured to be secured to the support 72 and an attachment portion 76 supported by the mounting portion 74. The attachment portion 76 can be provided with fastener openings 78 if desired (best shown in FIGS. 1 and 2). The illustrated attachment portion 76 is configured to removably receive the first end 16 of the extendable slide assembly 14 supporting the storage container 12 to support the storage container 12 through the extendable slide assembly 14 and to automatically actuate the first actuator 46 of the first lock 38 to unlock the first lock 38. Thus, the storage container 12 is free to be moved toward the attachment portion 76 of the support bracket 20 when the extendable slide assembly 14 is extended and the storage container 12 is free to be moved away from the attachment portion 76 of the support bracket 20 when the extendable slide assembly 14 is retracted and the second lock 40 is unlocked.

The illustrated the support bracket 20 has a vertically extending rear wall 80 connected through a bend to a horizontally extending bottom wall 82 forwardly extending from a bottom edge of the rear wall 80. A pair of opposed vertically extending side walls 84 forwardly extend for the lateral edges of the rear wall 80 through bends at the lateral edges of the rear wall 80. The illustrated side walls 84 each include a support tab 86 that is bent under the bottom wall 82 from bottom edges of the side walls 84. A first stop tab 88 is forwardly bent from the rear wall 80 to form a downward facing first stop or abutment located above and facing the top surface of the bottom wall 82. The first end connector 26 of the extendable slide assembly 14 is placed between the bottom wall 82 and the first abutment to limit upward movement of the first end connector 26 relative to the support bracket 20. The bottom wall 82 and the first abutment are spaced apart a distance that enables the first end connecter 26 to be inserted therebetween but minimizes relative movement between the first end connector 26 and the support bracket 20. A second top tab 90 is upwardly bent from a front edge of the bottom wall 82 to form a generally rearward facing second stop or abutment located in front of and facing the front surface of the rear wall 80. The first end connector 26 of the extendable slide assembly 14 is placed between the rear wall 80 and the second abutment to limit forward movement of the first end connector 26 relative to the support bracket 20. The rear wall 80 and the second abutment are spaced apart a distance that enables the first end connecter 26 to be inserted and removed but minimizes relative movement between the first end connector 26 and the support bracket 20 and enables the rear wall 80 to automatically depress the release button 46 of the first lock 38. With the first end connector 26 removably secured in this manner, the extendable slide assembly 14 forwardly and horizontally extends from the support bracket 20 and can be extended and retracted with the first lock 38 automatically unlocked. The illustrated support bracket 20 is formed of bent sheet metal but it is noted that the support bracket 20 can alternatively be formed of any other suitable material and/or formed by any other suitable method. The support bracket 20 can alternatively have any other suitable configuration.

Figure 9:
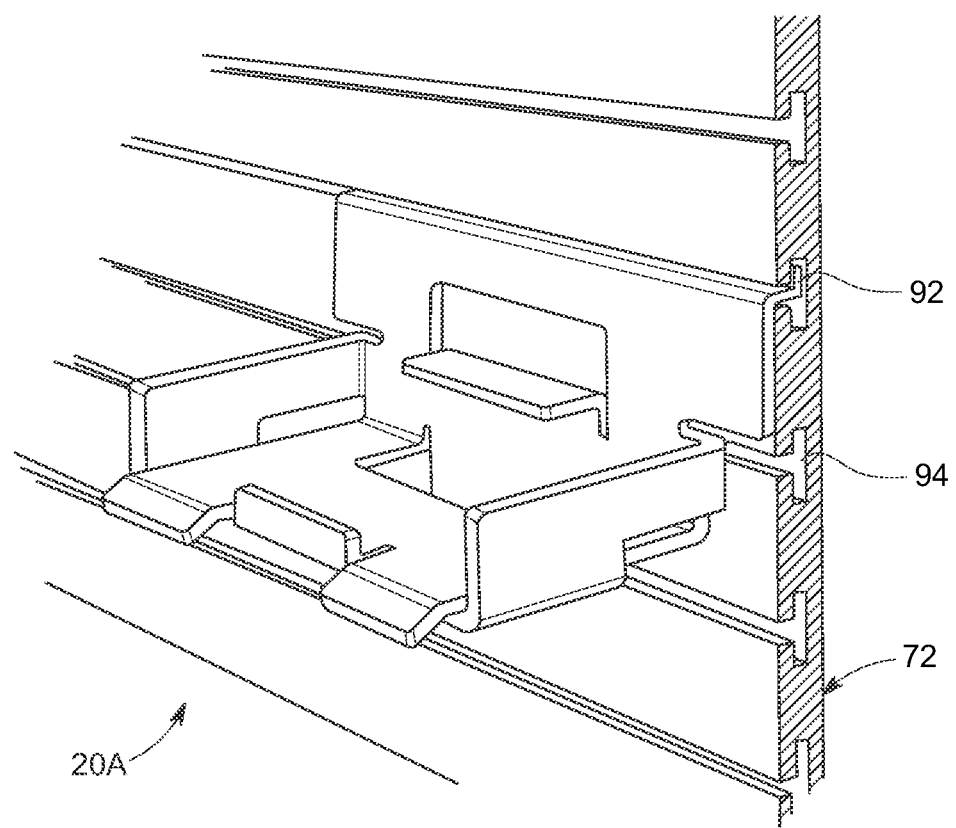
FIG. 9 is a perspective view of support bracket according to a first alternative embodiment, wherein the support bracket is mounted to a slotted support wall.

FIG. 9 illustrates a first alternative embodiment of the support bracket 20A. The first alternative support bracket 20A is substantially the same as the support bracket 20 described hereinabove except that the first alternative support bracket 20A is configured for use with a support 72 in the form of a slotted support wall. The first alternative support bracket 20A includes at least one tab 92 bent from the top edge of the rear wall 80 and configured to be inserted into a standard T-shaped slot 94. The illustrated tab 92 has a horizontal portion rearwardly extending from a bend at the top edge of the rear wall 80 and a vertical portion upwardly extending from a bend at the rear edge of the horizontal portion. The illustrated first alternative support bracket 20A is formed of bent sheet metal but it is noted that the support bracket 20A can alternatively be formed of any other suitable material and/or formed by any other suitable method. The first alternative support bracket 20A can alternatively have any other suitable configuration.

Figure 10:
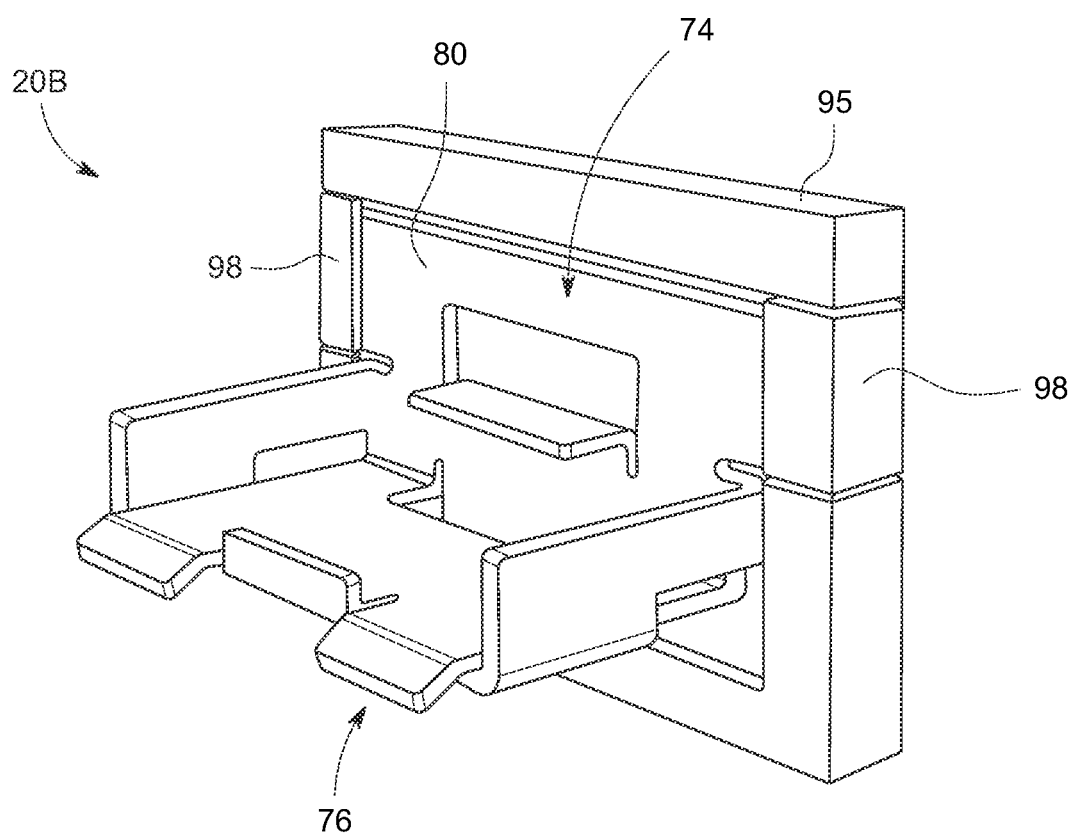
FIG. 10 is a perspective view of a support bracket according to a second alternative embodiment.
Figure 11:
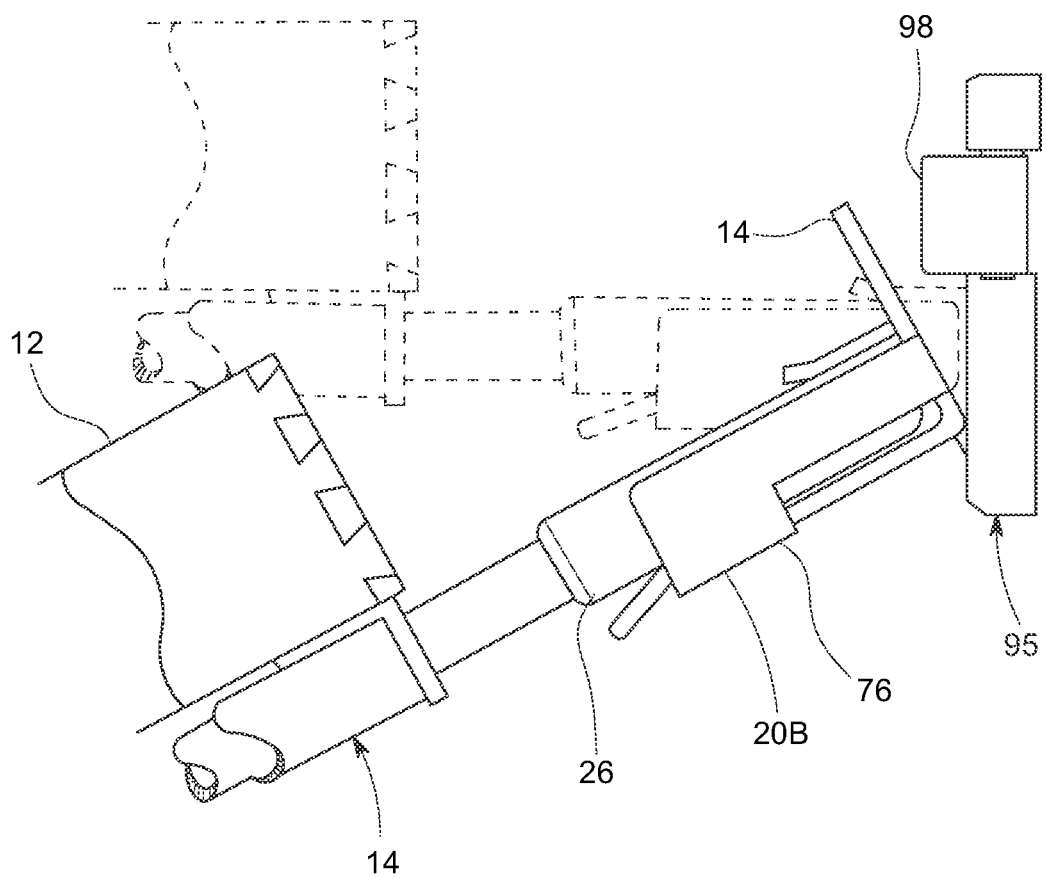
FIG. 11 is a side elevation view of the support bracket of FIG. 10, wherein a hinged portion of the support bracket is released.
Figure 12:
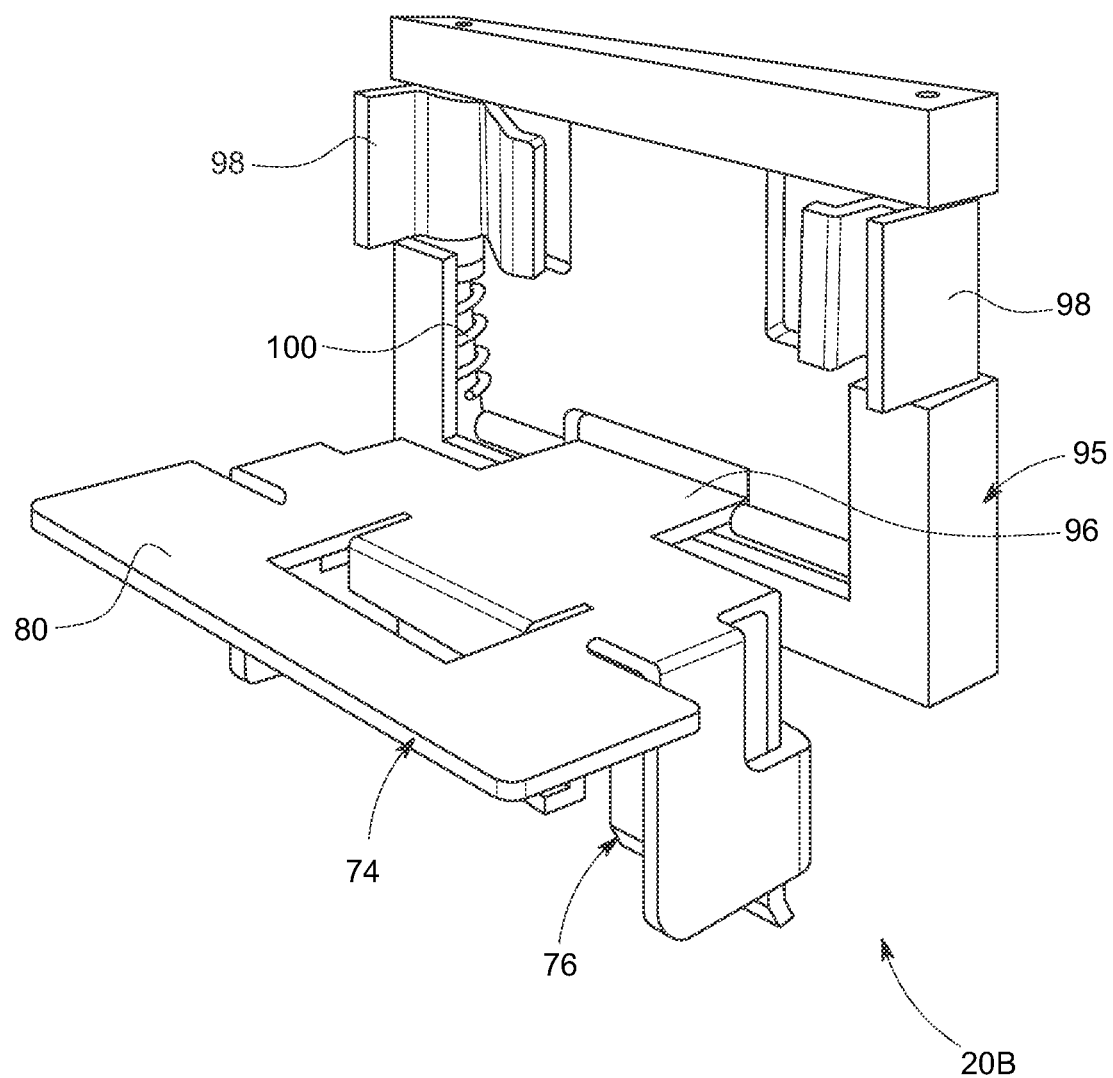
FIG. 12 is a perspective view of the support bracket of FIG. 10, wherein the hinged portion of the support bracket is released.

FIGS. 10 to 12 illustrate a second alternative embodiment of the support bracket 20B. The second alternative support bracket 20B is substantially the same as the support bracket 20 described hereinabove except that the mounting portion 74 is pivotably attached to a mounting frame 95 to provide a break-away feature. The illustrated mounting frame 95 is configured to be secured to the support 72 and an mounting portion 74 is pivotably attached to the support portion with a hinge 96 at its lower end so that the support bracket 20B pivots outwardly and downwardly from the mounting frame 95 when a predetermined break-away load is applied to the support bracket 20B. The predetermined break-away load can be, for example, about 50 pounds, but any other suitable predetermined load limit can alternatively be utilized. The break-away feature aids in preventing tip overs (along with the second lock) and aids in preventing damage to the extendable slide assembly 14 when higher than designed for loads are placed in or on the storage container 12. The illustrated mounting frame 95 includes a pair of opposed spring-loaded pivoting holding members 98 that extend in front of upper portions of the rear wall 80 of the mounting portion 74 of the support bracket 20B to hold the support bracket 28B in its upright position for use. When load on the support bracket 28B over comes the springs 100 biasing the holding members 98, the holding members 98 pivot about their vertical pivot axes causing the support bracket 28B to pivot downwardly bout its horizontal pivot axis to unload the support bracket 28B. The springs 100 are selected to provide the predetermined load limit. It is noted that second alternative support bracket 28B can alternatively have any other suitable configuration.

Figure 13:
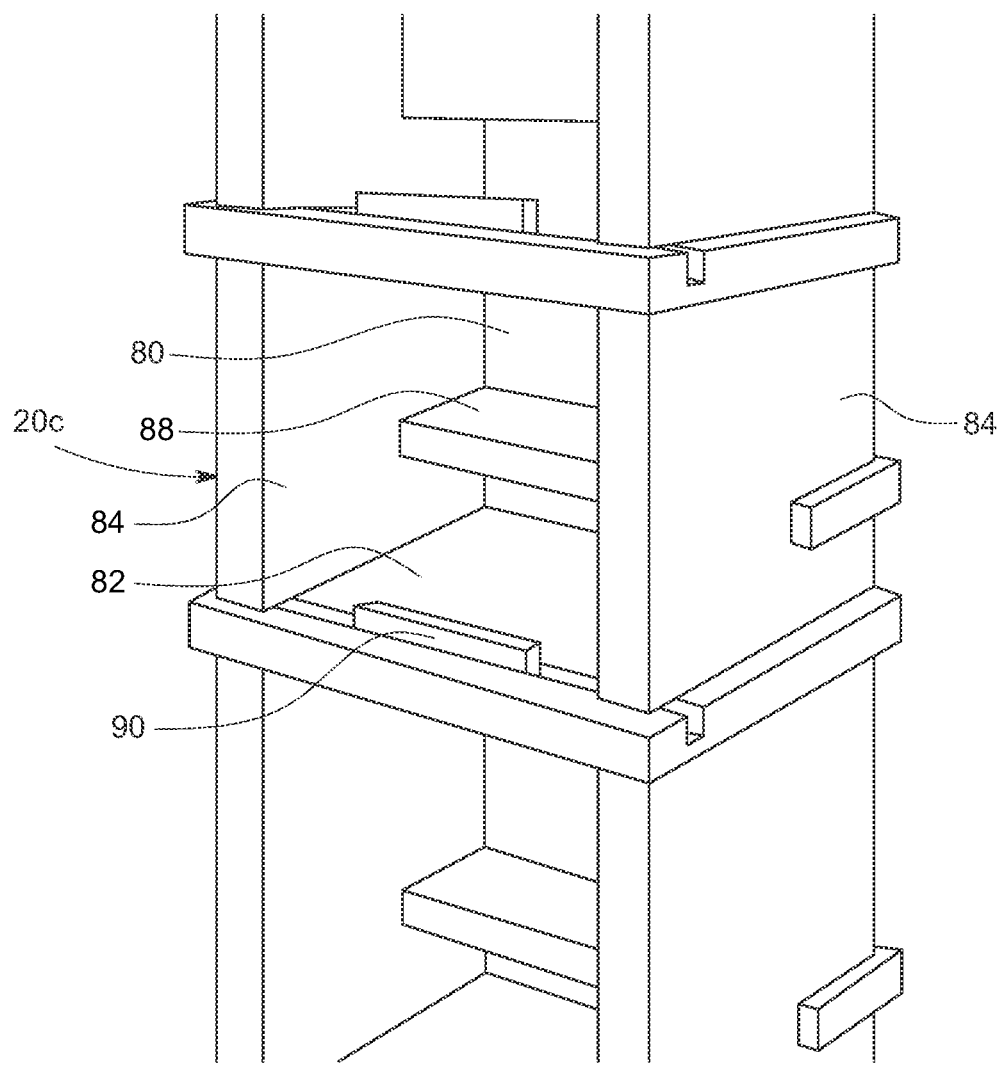
FIG. 13 is a perspective view of a support bracket according to a third alternative embodiment.

FIG. 13 illustrates a third alternative embodiment of the support bracket 20C. The third alternative support bracket 20C is substantially the same as the support bracket 20 described hereinabove except that the support bracket 20C is formed of wood panels or the like secured together. The third alternative support bracket 20C also illustrates that a plurality of the support brackets 20C can be formed together one above the other. It is noted that the third alternative support bracket 20C can alternatively have any other suitable configuration.

The storage container or compartment 12 can be of any suitable type. For example, but not limited to, bags, baskets, bins, boxes, buckets, cabinets, caddies, canisters, cans, chests, coolers, crates, cubes, drawers, luggage, suitcases, trunks, totes, tubs, and the like. The storage container or compartment 12 can also comprise any suitable material, for example, but not limited to, metal, plastic, rubber, cardboard, glass, wood, fabric, and the like.

Figure 14:
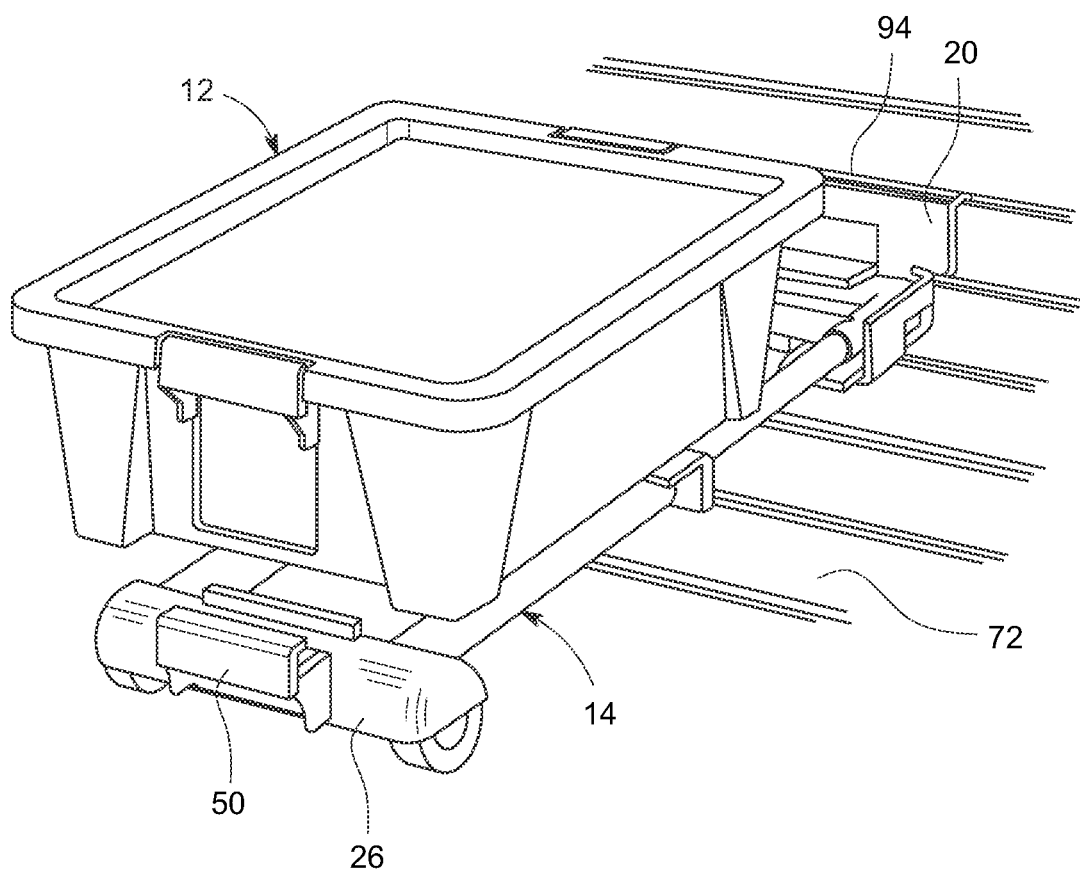
FIG. 14 is a perspective view of support system for a storage container according to another embodiment of the present invention, wherein the storage container is a storage tote removably supported on the extendable slide assembly of FIG. 2, and the support bracket of FIG. 9 is removably secured to a slotted wall and removably supporting the extendable slide assembly in a cantilevered manner.

FIG. 14 illustrates a first exemplary application the support system 10 according to the present invention. The storage container 12 is a storage tote removably supported on top of the extendable slide assembly 14. The extendable slide assembly 14 is removably secured to the support bracket 20 and cantilevered therefrom. The support bracket 20 is removably secured to a support 72 in the form of a slotted wall.

Figure 15:
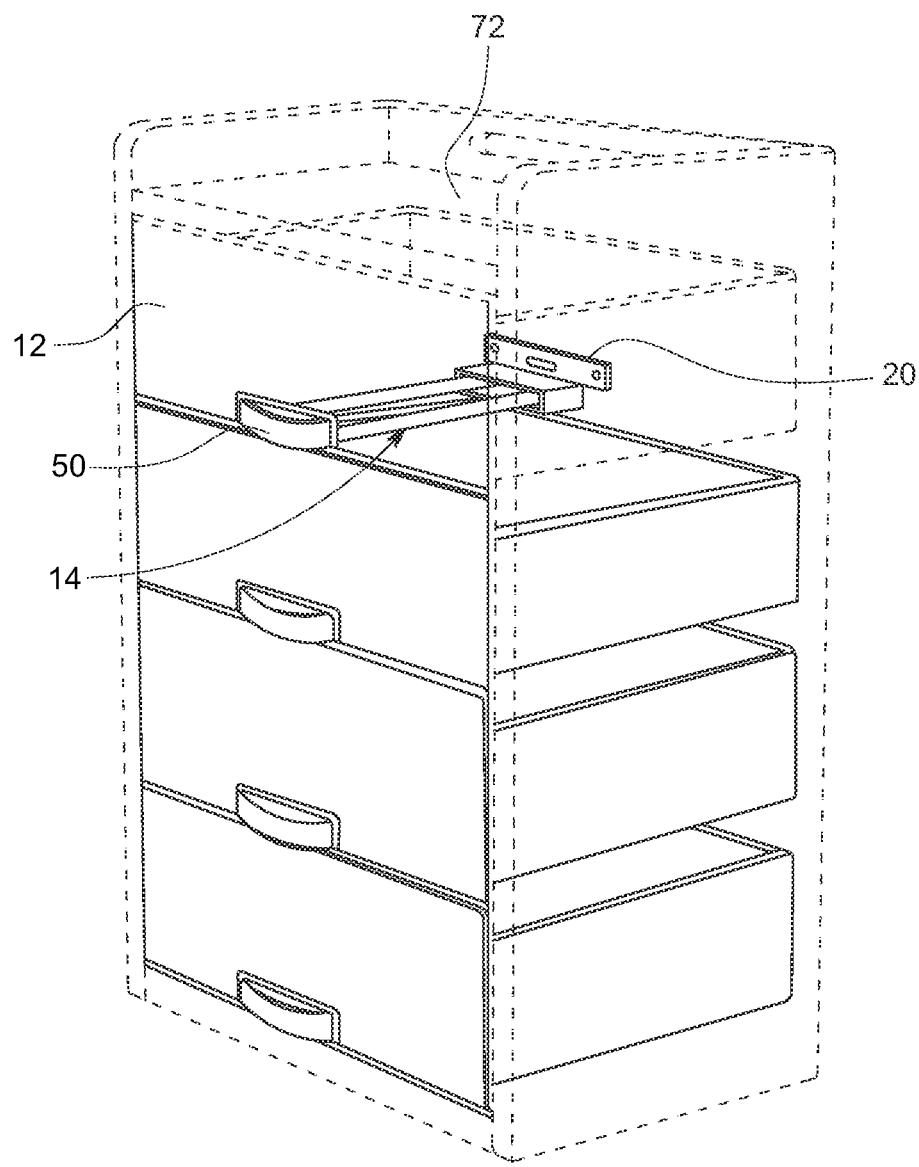
FIG. 15 is a perspective view of support system for a storage container according to another embodiment of the present invention, wherein the storage container is drawer secured to and supported by the extendable slide assembly of FIG. 2 and the support bracket of FIG. 8 is secured to a rear wall of a dresser and removably supporting the extendable slide assembly in a cantilevered manner.

FIG. 15 illustrates a second exemplary application the support system 10 according to the present invention. The illustrated storage container 12 is a box-shaped drawer with an open top side to access the interior space. The illustrated drawer has the flanges of the intermediate and second connectors of the extendable slide assembly 14 located therein and rigidly fixed thereto to prevent relative movement therebetween. A front opening is provided in a front side of the illustrated drawer to provide access to the drawer handle 50 of the second lock 40. A rear clearance opening is provided in a rear side of the illustrated drawer so that the first extendable members 24 of the extendable slide assembly 14 can pass therethrough. It is noted that the rear clearance opening is configured so that at least a portion of the support bracket 20 can pass therethrough so the rear of the draw can be selectively positioned near the rear support wall 72 to which the support bracket 20 is mounted. It is noted that the drawer/dresser can alternatively have any other suitable configuration.

Figure 16:
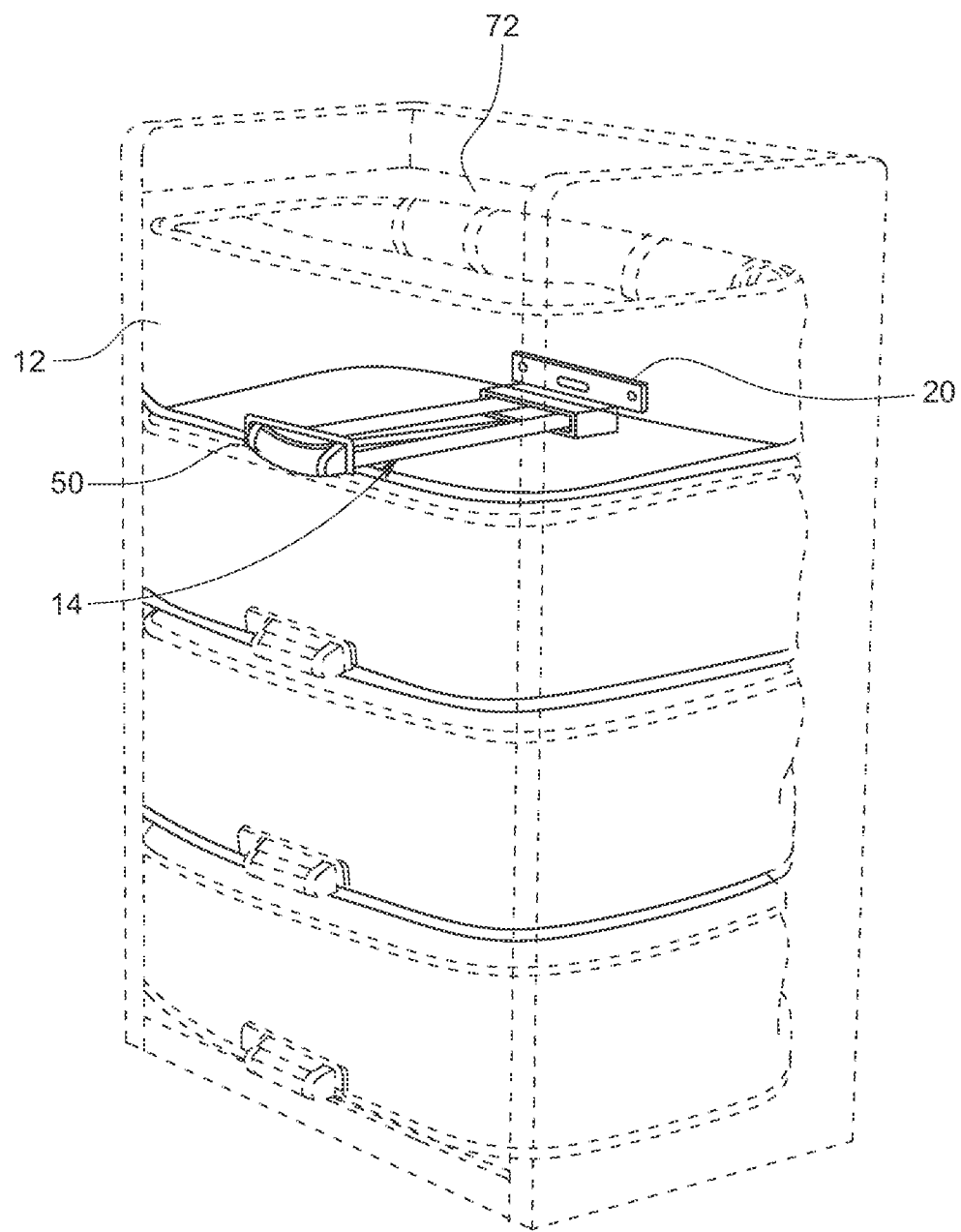
FIG. 16 is a perspective view of support system for a storage container according to another embodiment of the present invention, wherein the storage container is a suitcase with the extendable slide assembly of FIG. 1 extending therethrough and the support bracket of FIG. 8 is removably secured to a rear wall of a dresser and removably supporting the extendable slide assembly in a cantilevered manner.

FIG. 16 illustrates a third exemplary application the support system 10 according to the present invention. The illustrated storage container 12 is a suitcase and the extendable slide assembly 14 provides an extendable handle of the suitcase. The term "suitcase" is used herein and in the claims to mean a portable form of luggage with a handle so that the luggage can be hand carried by the traveler, and can be a wheeled suitcase or a non-wheeled suitcase, a soft sided suitcase or a hard sided suitcase, and an expandable suitcase or a non-expandable suitcase. The term "luggage is used herein and in the claims to mean bags, cases, and other containers 12 which store a traveler's articles such as clothing, toiletries, and other small personal items during transit. The support brackets 20 are secured to a rear wall 72 of a dresser so that the suitcases can be removably secured to the support brackets 20 so that the suitcases can be utilized as dresser drawers. The illustrated suitcases have removable or partially removable top walls to provide easy access into the suitcases when secured in this manner. It is noted that the suitcases/dresser can alternatively have any other suitable configuration.

Figure 17:
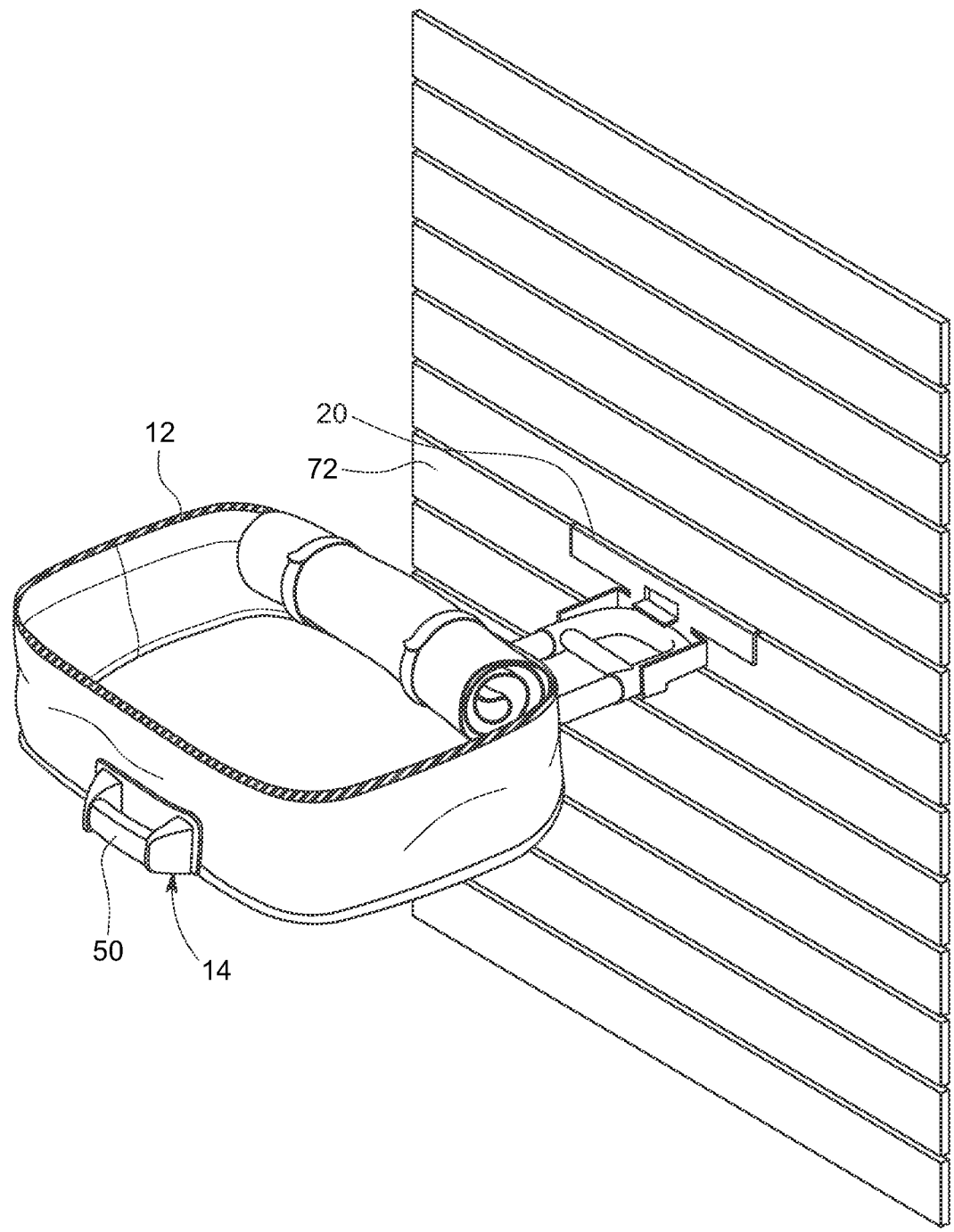
FIG. 17 is a perspective view of support system for a storage container according to another embodiment of the present invention, wherein the storage container is a suitcase with the extendable slide assembly of FIG. 1 extending therethrough and the support bracket of FIG. 9 is removably secured to a slotted wall and removably supporting the extendable slide assembly in a cantilevered manner.

FIG. 17 illustrates a fourth exemplary application the support system 10 according to the present invention. This application illustrates that support bracket 20 can be mounted to a wall 72 within a room such as, for example but not limited to, a hotel room. With the support bracket 20 mounted in this manner, a hotel guest can temporarily secure their suitcase to the support bracket 20 during their stay. It is noted that the room can alternatively be any other suitable type of room and that there can alternatively be any other suitable quantity and/or locations of the support brackets 20. The illustrated suitcases have removable or partially removable top walls to provide easy access into the suitcases when secured in this manner. It is noted that the suitcases/support wall can alternatively have any other suitable configuration.

Figure 18:
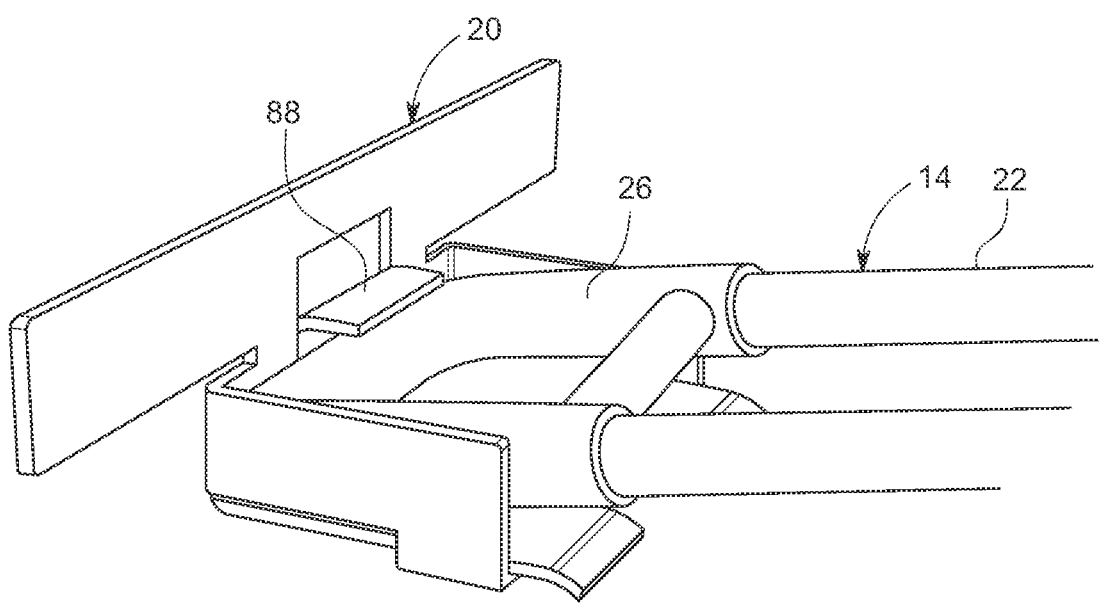
FIG. 18 is a right-side perspective view of the support bracket of FIG. 1 partially receiving a handle or connecting end of the extendable slide assembly of FIG. 1.
Figure 19:
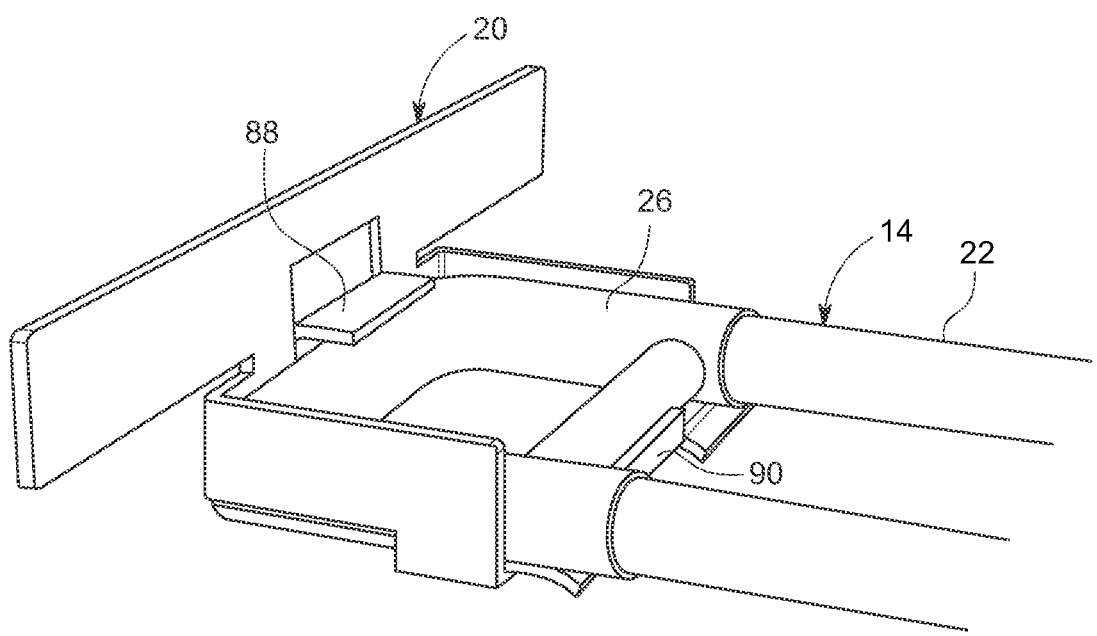
FIG. 19 is a perspective view similar to FIG. 19 but with the support bracket fully receiving the handle or connecting end of the extendable slide assembly so that the support bracket removably supports the extendable slide assembly in a cantilevered manner.

To removably secure the extendable slide assembly 14 to the support bracket 20, the first end 16 of the extendable slide assembly 14 is lowered toward the support bracket 20 in an angled manner in a rearward direction (best shown in FIG. 18). The first end connector 26 of extendable slide assembly 14 is moved rearward until it is fully rearward and the first end connector 26 is on the bottom wall 82 and below the abutment of the first stop tab 88 (best shown in FIG. 18). The first end connector 26 is then lowered so that the first end connector 26 is located between the abutment of the second stop tab 90 and the rear wall 80 with the release button 46 of the first lock 38 depressed against the rear wall 80 (best shown in FIG. 19). With the first end connector 26 of the extendable slide assembly 14 removably secured to the support bracket 20 in this manner, the storage container 12 is fully supported by the support bracket 20 through the extendable slide member in a cantilevered manner. It is noted that the components of the extendable slide assembly 14 must be configured to support the weight of the container 12 and its contents in this manner. The first end connector 26 can be easily removed from the support bracket by reversing the above described steps for insertion.

Figure 20:
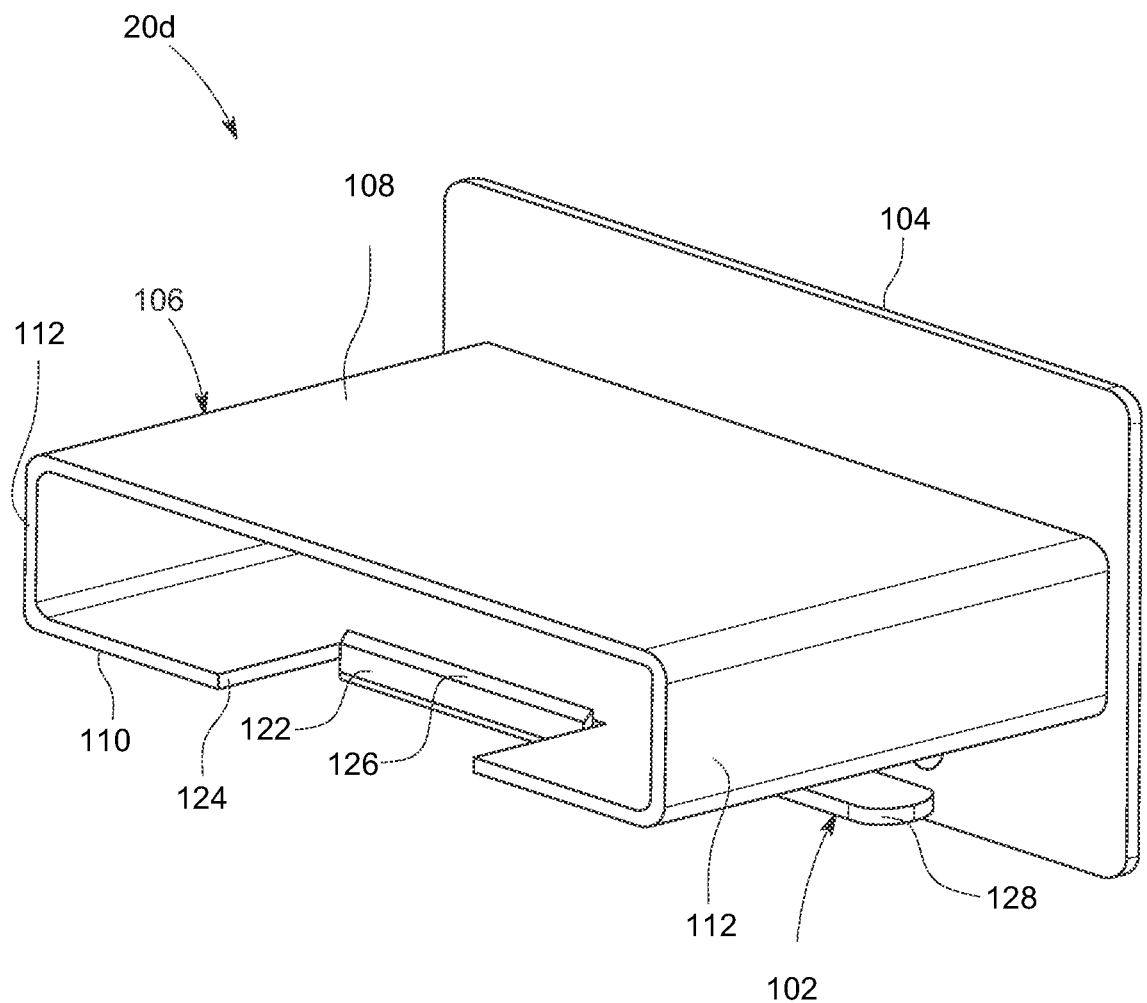
FIG. 20 is a top perspective view of a support bracket according to a fourth alternative embodiment.
Figure 21:
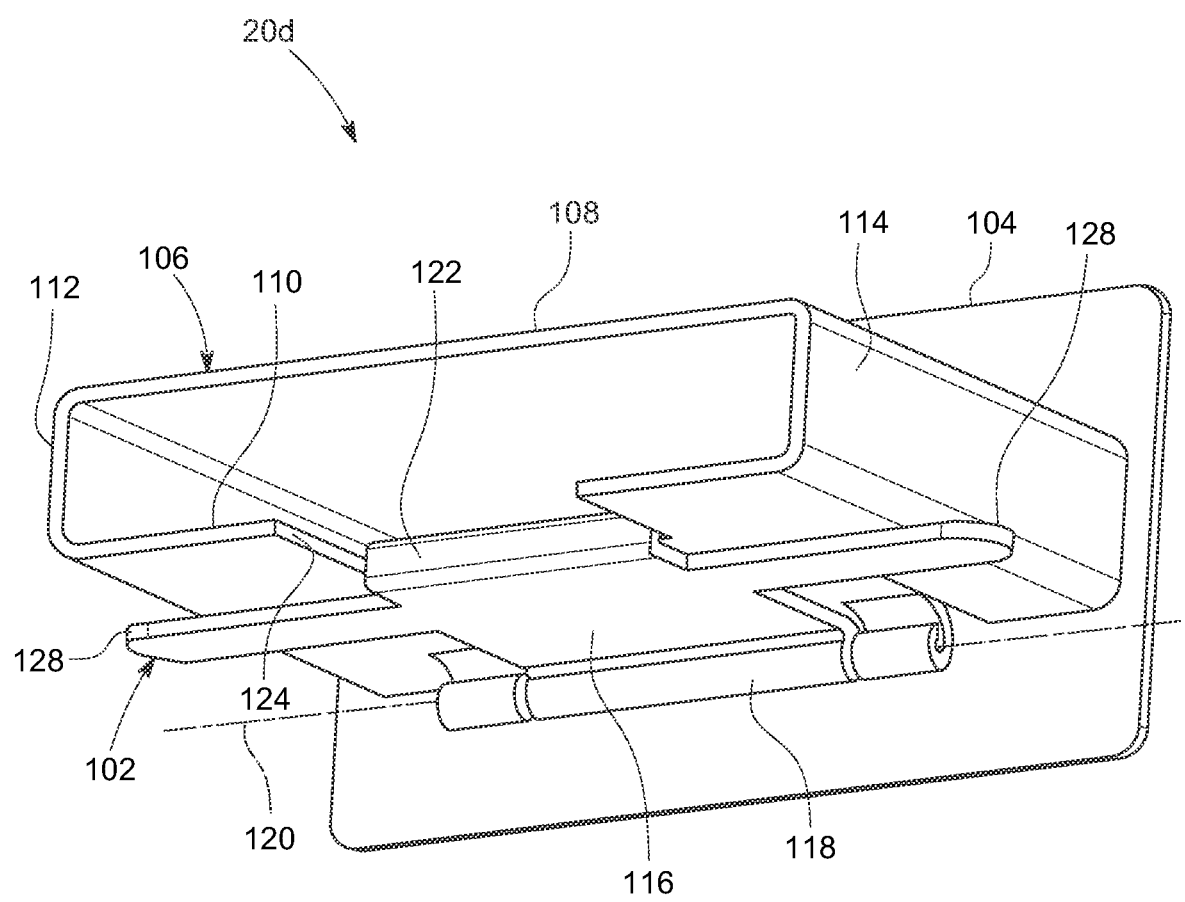
FIG. 21 is a bottom perspective view of the support bracket of FIG. 20.

FIGS. 20 and 21 illustrates a fourth alternative embodiment of the support bracket 20D. The fourth alternative support bracket 20D is substantially the same as the support bracket 20 described hereinabove except that the fourth alternative support bracket 20D is configured with a lock mechanism 102 to secure the extendable slide assembly 14 to the support bracket 20D so that the extendable slide assembly 14 is held by the support bracket 20D against inadvertent removal from the support bracket 20D and is configured so that the extendable slide assembly 14 is inserted straight into to the support bracket 20D in a level manner with no tilting required. Such a configuration is particularly useful in applications where loads may occur that could otherwise cause the extendable slide assembly 14 to "bounce" out of the unlocked support bracket 20, 20A, 20B, 20C. Such as for example, but not limited to, when the unlocked mounting bracket 20, 20A, 20B, 20C is mounted within a vehicle or the like and/or is mounted to a horizontal surface such as a ceiling or a floor.

The illustrated support bracket 20D includes the mounting portion 74 configured to be secured to the support 72, and the attachment portion 76 configured to be supported by the mounting portion 74. The attachment portion 76 can be provided with fastener openings 78 (best shown in FIGS. 1 and 2), at least one tab 92 for a slotted wall (best shown in FIG. 10), a break-away mounting frame 95 (best shown in FIGS. 10 to 12), or any other suitable mounting configuration.

The illustrated support bracket 20D includes a vertically-extending planar rear plate or wall 104, a horizontally-extending receiver 106, and the lock mechanism 102. The illustrated rear wall 104 forms the illustrated mounting portion 74. The receiver 106 and the lock mechanism 102 form the illustrated attachment portion 76. The illustrated receiver 106 is in the form of a rectangular-shaped tube or extrusion connected to and forwardly extending from the front side of the rear wall 104 so that the rear wall 104 at least partially closes a rear opening of the receiver 106. The rear wall 104 can be connected to the receiver 106 by welding or in any other suitable manner. The rectangular-shaped tube forming the receiver 106 includes a horizontally-extending top wall 108, a horizontally-extending bottom wall 110 spaced-apart below the top wall 108, a vertically-extending right wall 112 connecting the right edges of the top and bottom walls 108, 110, and a vertically-extending left wall 114 connecting the left edges of the top and bottom walls 108, 110. The bottom side of the top wall 108 of the receiver 106 forms a downward-facing stop or abutment that limits upward movement the first end connector 26 of the extendable slide assembly 14 when within the receiver 106. The top side of the bottom wall 110 of the receiver 106 forms an upward-facing stop or abutment that limits downward movement the first end connector 26 of the extendable slide assembly 14 when within the receiver 106. The left or inner side of the right-side wall 112 of the receiver 106 forms a leftward-facing stop or abutment that limits rightward movement the first end connector 26 of the extendable slide assembly 14 when within the receiver 106. The right or inner side of the left-side wall 114 of the receiver 106 forms a rightward-facing stop or abutment that limits leftward movement the first end connector 26 of the extendable slide assembly 14 when within the receiver 106. The rear wall 104 forms a forward-facing stop or abutment that limits rearward movement the first end connector 26 of the extendable slide assembly 14 when within the receiver 106. The illustrated lock mechanism 102 forms a rearward facing abutment that limits rearward movement the first end connector 26 of the extendable slide assembly 14 when within the receiver 106 as described in more detail hereinbelow. These six stops or abutments are each preferably sized, shaped and configured to minimize relative movement between the first end connector 26 of the extendable slide assembly 14 and the support bracket 20D. It is noted that the rear wall 104 and/or the receiver 106 can alternatively have any other suitable size, shape, or configuration.

The lock mechanism 102 is configured so that at least one of the stops or abutments is selectively movable between a locking position that minimizes relative movement between the first end connector 26 of the extendable slide assembly 14 and the support bracket 20D and an unlocking position which permits relative movement between the first end connector 26 of the extendable slide assembly 14 and the support bracket 20D in at least one direction so that the first end 2 connector 6 of the extendable slide assembly 14 can be inserted into or removed from the support bracket 20D. The illustrated lock mechanism 102 includes a main portion 116 secured to the rear wall 104 below the receiver 106 with a spring hinge 118 having a laterally and horizontally extending pivot axis 120, and an abutment portion 122 extending from the main portion 116. The illustrated main portion 122 is a planar plate and is urged upward toward and against the bottom wall 110 of the receiver 106. The illustrated abutment portion 122 perpendicularly extends upward from a forward or free end of the main portion 116 so that the abutment portion 122 extends into the interior of the receiver 106 through an opening 124 in the bottom wall 110 of the receiver 106 when in the locking position. The illustrated abutment portion 122 has a planar rear side that forms the rearward facing stop or abutment that limits forward movement of the first end connector 26 of the extendable slide assembly 14 when the first end connector 26 is located within the receiver 106. The illustrated abutment portion 122 also has a front side that forms a camming surface 126 that forces the abutment portion 122 downward against the bias of the spring hinge 118 when the first end connector 26 of the extendable slide assembly 14 engages the camming surface 126 during insertion of the first end connector 26 into the receiver 106. The abutment portion 122 resiliently pivots back up to the locking position once the first connecting portion 26 is out of engagement with the camming surface 126. The illustrated camming surface 126 angles outward in the downward direction when in the locking position but any other suitable size or configuration can alternatively be utilized. The illustrated lock mechanism 102 also has a pair of handle portions 128 that extend laterally outward from opposed lateral sides of the main portion 116 beyond the left and right sidewalls of the receiver 105. Positioned in this manner, a user can press downward on one or both of the handle portions 128 to move the abutment portion 122 against the bias of the spring hinge 118 from the locking position to the unlocking position so that the first end connector 26 of the extendable slide assembly 14 can be removed from the receiver 106 of the support bracket 20D. The illustrated handle portions 128 are planar and elongate such that they are extensions of the planar main portion 116. It is noted that the handle portions 128 can alternatively have any other suitable quantity, size, shape, or configuration. It is also noted that the lock mechanism 102 can alternatively have any other suitable configuration. It is further noted that the support bracket 20D can alternatively have any other suitable configuration.

Figure 26:
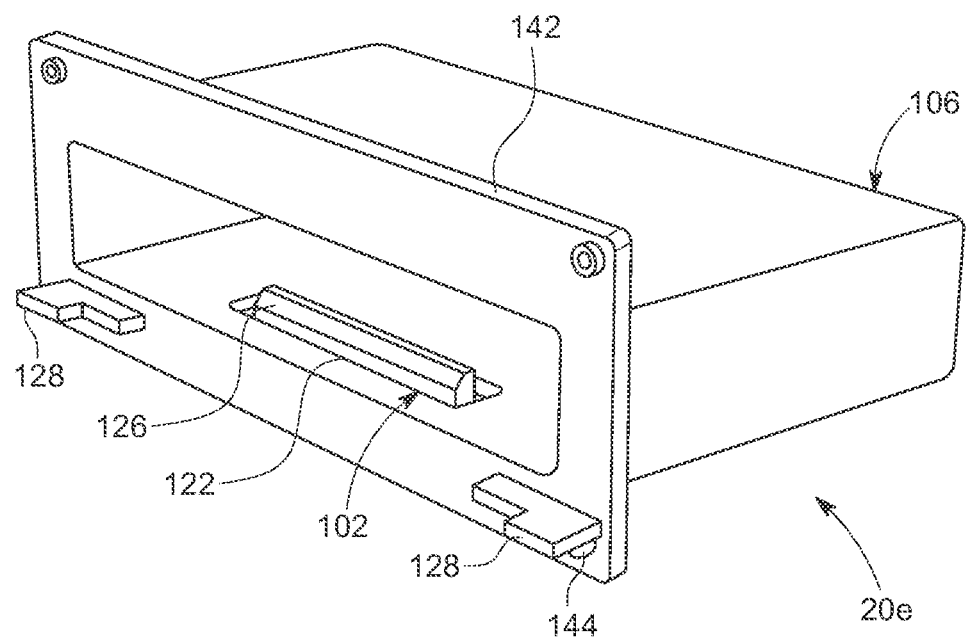
FIG. 26 is a perspective view of a variation of the support bracket of FIGS. 20 and 21 wherein the support bracket is configured to be flush mounted on a wall.

FIGS. 22 to 25 illustrate a variation of the extendable slide assembly 14 which is substantially the same as described above except that it includes a bracket release arm 130 that cooperates with the above described lock mechanism 102 of the support bracket 20D. The bracket release arm 130 enables a user to move the lock mechanism 120 from the locking position to the unlocking position from at or near the free end of the extendable slide assembly 14 rather than or in addition to pressing the handle portions 128 of the support bracket 20D. The first end of the bracket release arm 130 is located at the first end connector 26 so that the bracket release arm 130 can selectively interact with the lock mechanism 102 of the support bracket 20D and the second end of the bracket release arm 130 is located at or near the opposed or second end connector 28 of the extendable slide assembly 14 so that a user can actuate the bracket release arm 130 to unlock the lock mechanism 120 from the free end of the extendable slide assembly 14. As best shown in FIG. 26, the first end of the release arm 130 has an upturned end portion 132 that is that is biased toward the first end connector 26 of the extendable slide assembly 14 by a coil spring 134 to an un-activated position. The first end of the bracket release arm 130 also has a downturned end portion 136 forming a camming surface 138. When second end of the bracket release arm 130 is pulled, the bracket release arm 130 is moved is to an activated position against the bias of the coil spring 134. When the bracket release arm 130 is moved to the activated position, the camming surface 138 downwardly pivots the abutment portion 122 of the lock mechanism 120 against the bias of the spring hinge 118 so that the abutment portion 122 is in the its unlocking position and the user can pull the extendable slide assembly 14 out from the support bracket 20D once the rearward facing abutment is out of its path. The illustrated camming surface 138 angles rearward in the downward direction but can alternatively have any other suitable configuration. The second end of the bracket release arm 130 has a downturned end 140 to form a handle for selectively pulling the bracket release arm 130. It is noted that the downturned handle 140 can alternatively have any other suitable configuration. It is also noted that the bracket release arm 130 can alternatively have any other suitable configuration or could be eliminated if desired.

Figure 22:
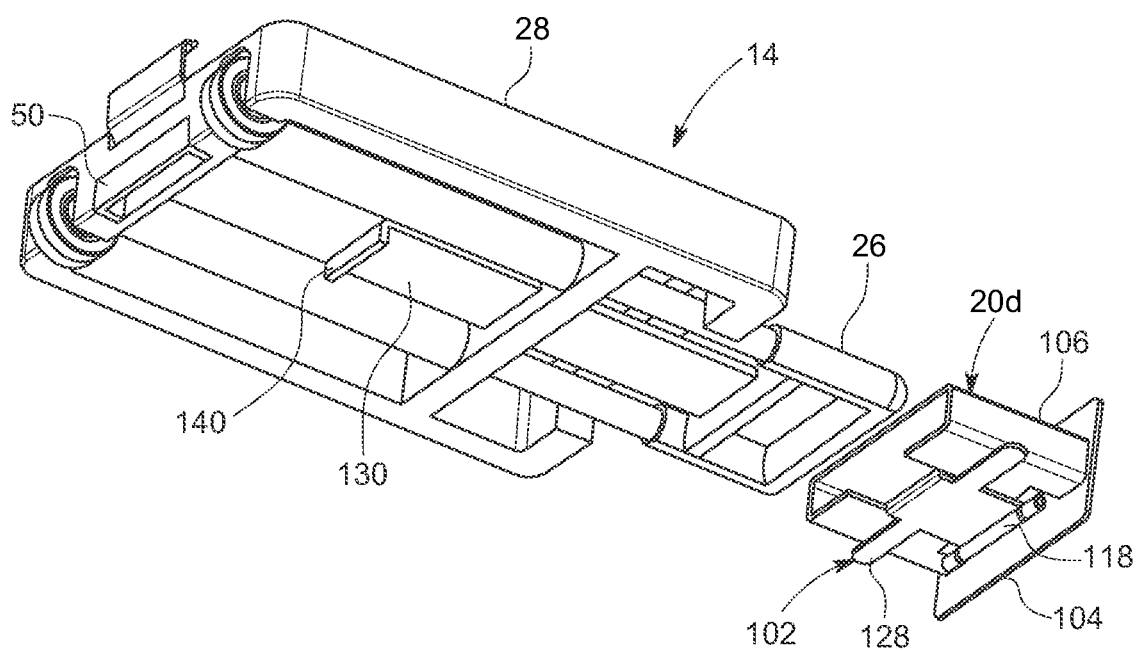
FIG. 22 is a bottom perspective view of a support system for a storage container according to another embodiment of the present invention, wherein the storage container is not shown and the extendable slide assembly is about to be inserted into the support bracket of FIGS. 21 and 22.
Figure 23:
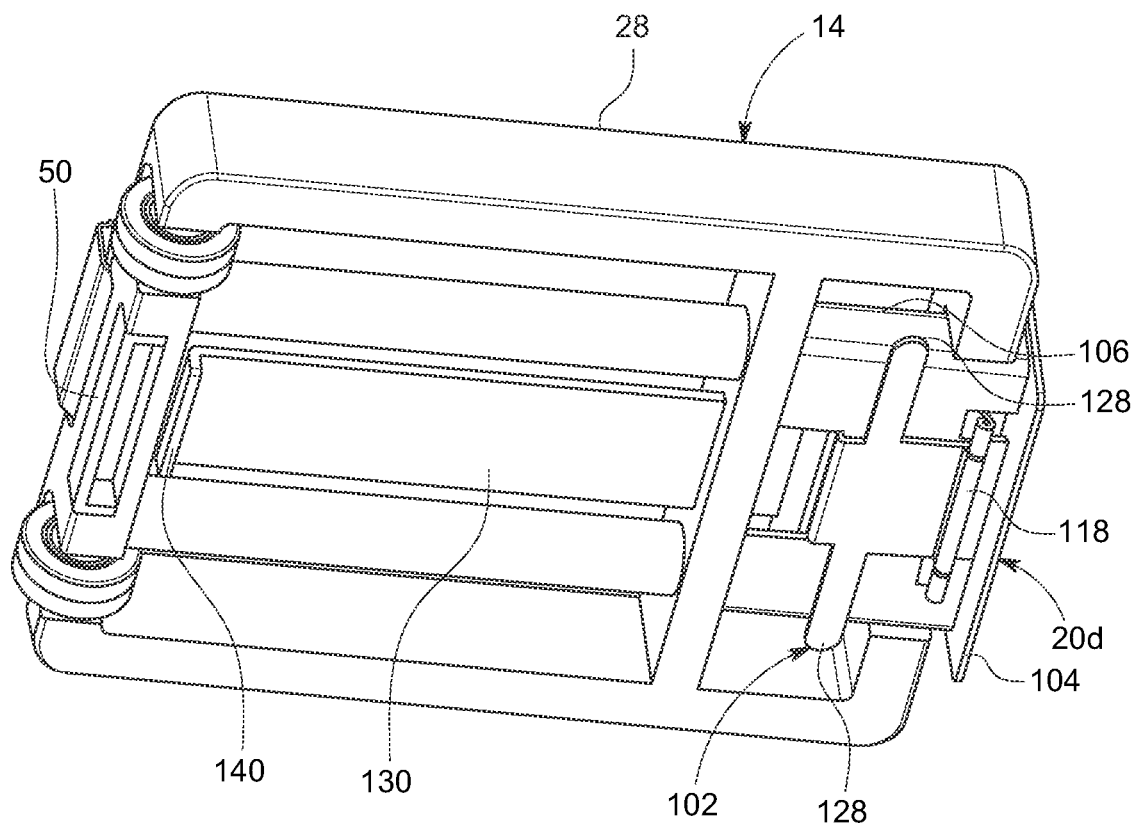
FIG. 23 is a perspective bottom view of a support system for a storage container of FIG. 22, but wherein the extendable slide assembly is removably locked into the support bracket of FIGS. 21 and 22.
Figure 24:
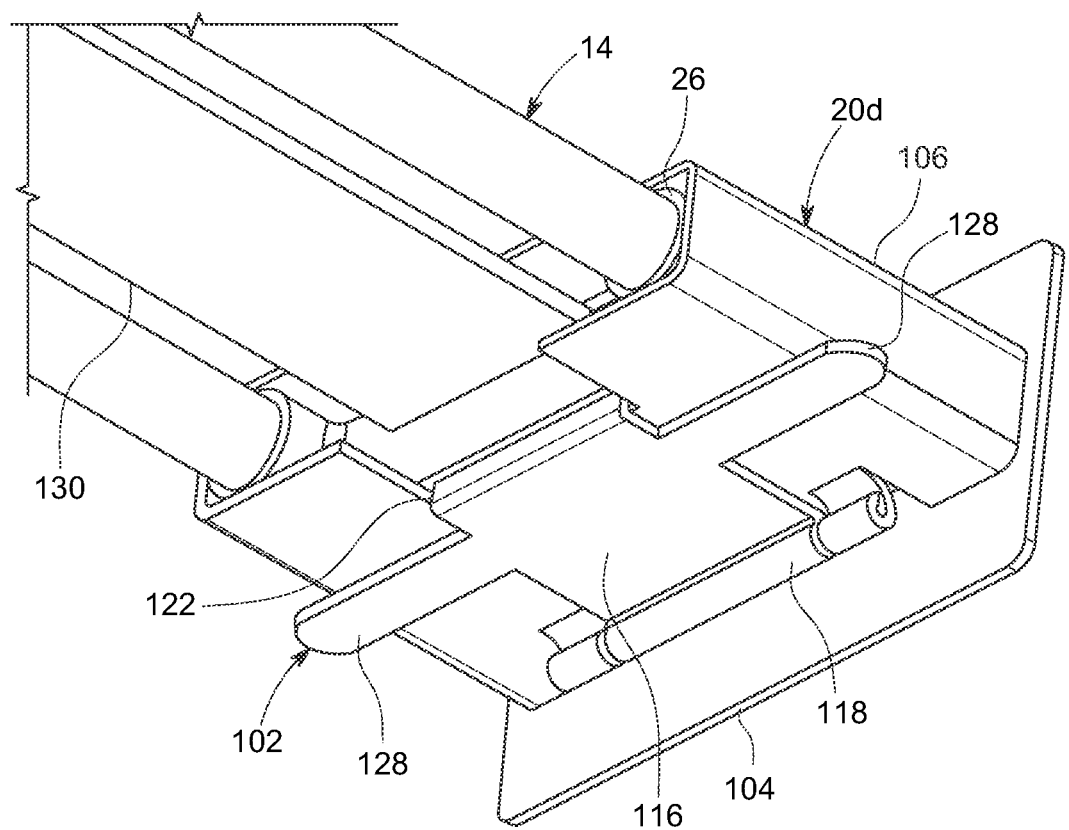
FIG. 24 is a fragmented and enlarged view of a portion of FIG. 23 showing the support system of FIGS. 22 and 23 at the support bracket.
Figure 25:
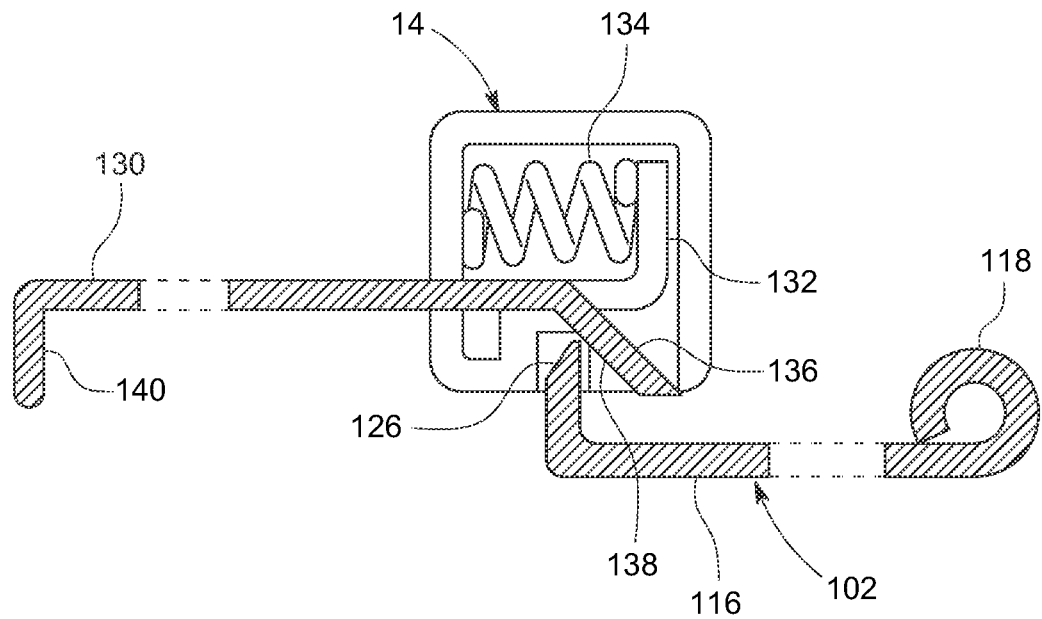
FIG. 25 is a side-elevational view of a bracket release arm of the extendable slide assembly of FIGS. 22 to 24.

To removably secure the extendable slide assembly 14 in the support bracket 20D, the extendable slide assembly 14 is held horizontal and level with the support bracket 20D and is moved in a straight rearward direction toward the support bracket 20D (best shown in FIG. 22). The first end connector 26 of the extendable slide assembly 14 is moved rearward until it is fully within the receiver 106 of the support bracket 20D (best shown in FIG. 23). During insertion, the first end connector 26 engages the camming surface 126 of the lock mechanism 102 so that the abutment portion 122 is pivoted down to its unlocking position so that the first end connector 26 can pass by. Once first end connector 26 is past the abutment portion 122, the abutment portion 122 resiliently snaps back into the locking position by the bias of the spring hinge 118 so that the first end connector 26 is retained or locked within the receiver 106 of the support bracket. 20D. With the first end connector 26 of the extendable slide assembly 14 removably secured to the support bracket 20D in this manner, the storage container 12 is fully supported by the support bracket 20D through the extendable slide assembly 14 in a cantilevered manner. The extendable slide assembly 14 can be easily removed from the support bracket 20D by either pulling the bracket release arm 130 or by pushing down one or both of the handle. portions 128 of the lock mechanism 102 to move the abutment portion 122 of the lock mechanism 102 to the unlocking position and forwardly pulling the extendable slide assembly 14 out of the receiver 106 of the support bracket 20D.

FIG. 26 illustrates a support bracket 20E that is a variation of the support bracket 20D which is substantially the same as the support bracket 20D described hereinabove except that it is configured to mounted within and flush with the outer surface of a support or wall 72. In the support bracket 20E, the rear wall 104 is sized and shaped to cover the rear end of the receiver 106. Additionally, a mounting plate 142 is provided at the front end of the receiver 106 that is configured to be secured to the wall 72 with the receiver located within the wall 72. The handle portions 128 of the lock mechanism 102 extend forward through openings 144 in the front mounting plate 142 to provide access to the user. It is noted that this variation of the support bracket 20E can alternatively have any other suitable configuration.

Any of the features or attributes of the above-described embodiments and variations can be used in combination with any of the other features and attributes of the above-described embodiments and variations as desired.

From the foregoing disclosure it will be apparent that the illustrated storage container support systems, devices, and methods provide greatly improved versatility and simplified, safe and economic transport and/or storage of personal items and other goods.

From the foregoing disclosure and detailed description of certain preferred embodiments, it will be apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A support bracket for supporting an extendable slide assembly in a cantilevered manner from a support, the extendable slide assembly having a first end for removable attachment to the support bracket and a second end for supporting a storage compartment, the support bracket comprising, in combination:
   a mounting portion configured to be secured to the support; and
   an attachment portion supported by the mounting portion and configured to removably receive the first end of the extendable slide assembly;
   wherein the attachment portion includes a plurality of abutments comprising:
      at least one downward facing abutment configured to limit upward movement of the first end of the extendable slide assembly;
      at least one upward facing abutment located at least partially facing the at least one downward facing abutment, and configured to limit downward movement of the first end of the extendable slide assembly;
      at least one right facing abutment located at least partially between the at least one downward facing abutment and the at least one upward facing abutment in the vertical direction, and configured to limit leftward movement of the first end of the extendable slide assembly;
      at least one left facing abutment located at least partially facing the at least one right facing abutment, located at least partially between the at least one downward facing abutment and the at least one upward facing abutment in the vertical direction, and configured to limit rightward movement of the first end of the extendable slide assembly;
      at least one forward facing abutment located at least partially between the at least one right facing abutment and the at least one left facing abutment in the lateral direction, and configured to limit rearward movement of the first end of the extendable slide assembly;
      at least one rearward facing abutment located at least partially facing the at least one forward facing abutment, located at least partially between the at least one right facing abutment and the at least one left facing abutment in the lateral direction, and configured to limit forward movement of the first end of the extendable slide assembly; and wherein a lock mechanism is configured to selectively move at least one of the abutments between a locking position limiting movement of the first end of the extendable slide assembly against inadvertent removal from the attachment portion of the mounting bracket and an unlocking position to allow movement of the first end of the extendable slide assembly in at least one direction substantially parallel to the at least one downward and upper facing abutments so that the first end of the extendable side assembly can be inserted straight into and out of the attachment portion of the mounting bracket.

2. The support bracket according to claim 1, wherein the lock mechanism selectively moves the rearward facing abutment between the locking position and the unlocking position.

3. The support bracket according to claim 1, wherein the lock mechanism is spring biased to the locking position.

4. The support bracket according to claim 1, wherein the lock mechanism is spring biased to the locking position by a spring hinge.

5. The support bracket according to claim 1, wherein the lock mechanism includes at least one handle for selectively and manually moving the at least one abutment from the locking position to the unlocking position.

6. The support bracket according to claim 1, wherein the lock mechanism can be selectively moved from the locking position to the unlocking position by a release arm carried by the extendable slide assembly.

7. A support system for a storage container comprising, in combination:
- an extendable slide assembly having a first end and a second end;
- wherein the second end of the extendable slide assembly is configured to support the storage container;
- a support bracket having an attachment portion removably receiving the first end of the extendable slide assembly to support the extendable slide assembly in a cantilevered manner;
- wherein the attachment portion includes a plurality of abutments comprising:
  - at least one downward facing abutment configured to limit upward movement of the first end of the extendable slide assembly;
  - at least one upward facing abutment located at least partially facing the at least one downward facing abutment, and configured to limit downward movement of the first end of the extendable slide assembly;
  - at least one right facing abutment located at least partially between the at least one downward facing abutment and the at least one upward facing abutment in the vertical direction, and configured to limit leftward movement of the first end of the extendable slide assembly;
  - at least one left facing abutment located at least partially facing the at least one right facing abutment, located at least partially between the at least one downward facing abutment and the at least one upward facing abutment in the vertical direction, and configured to limit rightward movement of the first end of the extendable slide assembly;
  - at least one forward facing abutment located at least partially between the at least one right facing abutment and the at least one left facing abutment in the lateral direction, and configured to limit rearward movement of the first end of the extendable slide assembly;
  - at least one rearward facing abutment located at least partially facing the at least one forward facing abutment, located at least partially between the at least one right facing abutment and the at least one left facing abutment in the lateral direction, and configured to limit forward movement of the first end of the extendable slide assembly; and
- wherein a lock mechanism is configured to selectively move at least one of the abutments between a locking position limiting movement of the first end of the extendable slide assembly against inadvertent removal from the attachment portion of the mounting bracket and an unlocking position to allow movement of the first end of the extendable slide assembly in at least one direction substantially parallel to the at least one downward and upper facing abutments so that the first end of the extendable side assembly can be inserted straight into and out of the attachment portion of the mounting bracket.

8. The support system according to claim 7, wherein the lock mechanism selectively moves the rearward facing abutment between the locking position and the unlocking position.

9. The support system according to claim 7, wherein the lock mechanism is spring biased to the locking position.

10. The support system according to claim 7, wherein the lock mechanism is spring biased to the locking position by a spring hinge.

11. The support system according to claim 7, wherein the lock mechanism includes at least one handle for selectively and manually moving the at least one abutment from the locking position to the unlocking position.

12. The support system according to claim 7, wherein the lock mechanism can be selectively moved from the locking position to the unlocking position by a release arm carried by the extendable slide assembly.

13. The support system according to claim 7, wherein the first end of the extendable slide assembly includes a handle and the support bracket receives the handle.

14. A storage container support system-comprising, in combination:
- a storage container;
- an extendable slide assembly having a first end and a second end, wherein the second end moves away from the first end and toward the first end respectively when the extendable slide assembly is extended and retracted;
- wherein the second end of the extendable slide assembly is configured to support the storage container;
- a support bracket including a mounting portion and an attachment portion supported by the mounting portion and a lock mechanism, wherein the attachment portion is configured to selectively and removably receive the first end of the extendable slide assembly;
- wherein the attachment portion includes a plurality of abutments comprising:
  - at least one downward facing abutment configured to limit upward movement of the first end of the extendable slide assembly;
  - at least one upward facing abutment located at least partially facing the at least one downward facing abutment, and configured to limit downward movement of the first end of the extendable slide assembly;

at least one right facing abutment located at least partially between the at least one downward facing abutment and the at least one upward facing abutment in the vertical direction, and configured to limit leftward movement of the first end of the extendable slide assembly;

at least one left facing abutment located at least partially facing the at least one right facing abutment, located at least partially between the at least one downward facing abutment and the at least one upward facing abutment in the vertical direction, and configured to limit rightward movement of the first end of the extendable slide assembly;

at least one forward facing abutment located at least partially between the at least one right facing abutment and the at least one left facing abutment in the lateral direction, and configured to limit rearward movement of the first end of the extendable slide assembly;

at least one rearward facing abutment located at least partially facing the at least one forward facing abutment, located at least partially between the at least one right facing abutment and the at least one left facing abutment in the lateral direction, and configured to limit forward movement of the first end of the extendable slide assembly; and wherein the lock mechanism is configured to selectively move at least one of the abutments between a locking position limiting movement of the first end of the extendable slide assembly against inadvertent removal from the attachment portion of the mounting bracket and an unlocking position to allow movement of the first end of the extendable slide assembly in at least one direction substantially parallel to the at least one downward and upper facing abutments so that the first end of the extendable side assembly can be inserted straight into and out of the attachment portion of the mounting bracket.

15. The storage container support system according to claim 14, wherein the lock mechanism selectively moves the rearward facing abutment between the locking position and the unlocking position.

16. The storage container support system according to claim 14, wherein the lock mechanism is spring biased to the locking position.

17. The storage container support system according to claim 14, wherein the lock mechanism is spring biased to the locking position by a spring hinge.

18. The storage container support system according to claim 14, wherein the lock mechanism includes at least one handle for selectively and manually moving the at least one abutment from the locking position to the unlocking position.

19. The storage container support system according to claim 14, wherein the lock mechanism can be selectively moved from the locking position to the unlocking position by a release arm carried by the extendable slide assembly.

20. The storage container support system according to claim 14, wherein the first end of the extendable slide assembly includes a handle and the support bracket receives the handle.

* * * * *